United States Patent [19]
Mori

[11] Patent Number: 5,920,434
[45] Date of Patent: Jul. 6, 1999

[54] COLOR-IMAGE-READING GAUSSIAN LENS

[75] Inventor: Masao Mori, Omiya, Japan

[73] Assignee: Fuji Photo Optical Co., Ltd., Omiya, Japan

[21] Appl. No.: 09/150,348

[22] Filed: Sep. 9, 1998

[30] Foreign Application Priority Data

Sep. 29, 1997 [JP] Japan .................................. 9-281459

[51] Int. Cl.[6] .............................. G02B 13/22; G02B 3/08; G02B 9/62
[52] U.S. Cl. ........................... 359/663; 359/740; 359/760
[58] Field of Search .................. 359/663, 740, 359/760

[56] References Cited

U.S. PATENT DOCUMENTS

| | | | |
|---|---|---|---|
| 1,945,977 | 2/1934 | Oswald | 359/663 |
| 2,701,982 | 2/1955 | Angenieux | 359/760 |
| 2,986,071 | 5/1961 | Baker | 359/760 |
| 3,350,157 | 10/1967 | Solisch et al. | 359/760 |
| 3,718,384 | 2/1973 | Maisubara | 359/760 |
| 3,737,215 | 6/1973 | De Jager | 359/760 |
| 3,738,736 | 6/1973 | Shimizu | 359/760 |
| 3,851,953 | 12/1974 | Nakagawa | 359/760 |
| 3,865,471 | 2/1975 | McCrobie | 359/760 |
| 4,110,007 | 8/1978 | Ikeda | 359/760 |
| 4,165,916 | 8/1979 | Nakamura | 359/760 |
| 4,182,550 | 1/1980 | Yamaguchi | 359/760 |
| 4,247,171 | 1/1981 | Tsuji | 359/760 |
| 4,340,279 | 7/1982 | Ikemori | 359/760 |
| 4,364,643 | 12/1982 | Momiyama | 359/760 |
| 4,364,644 | 12/1982 | Ikemori | 359/760 |
| 4,448,497 | 5/1984 | Wakamiya | 359/760 |
| 4,466,710 | 8/1984 | Kato et al. | 359/760 |
| 4,908,639 | 3/1990 | Yanagisawa | 359/760 |
| 5,285,319 | 2/1994 | Kanoshima | 359/760 |
| 5,388,003 | 2/1995 | Naganuma et al. | 359/760 |
| 5,768,021 | 6/1998 | Ori | 359/618 |

FOREIGN PATENT DOCUMENTS

| | | |
|---|---|---|
| 57-108817 | 7/1982 | Japan . |
| 62-94810 | 5/1987 | Japan . |
| 2-124507 | 5/1990 | Japan . |
| 4-163508 | 6/1992 | Japan . |
| 4-311912 | 11/1992 | Japan . |

Primary Examiner—Georgia Epps
Assistant Examiner—Evelyn A. Lester
Attorney, Agent, or Firm—Ronald R. Snider

[57] ABSTRACT

Provided is a color-image-reading Gaussian lens for reading out color images, color originals, or negative or positive films, which is suitably used at a low magnification of $-1/2.5\times$ to $-1/1.25\times$, effectively corrects axial chromatic aberration in particular, and exhibits high performances in a wide wavelength range. A six-sheet Gaussian lens comprises, successively from an object side, two convex lenses, two concave lenses, and two convex lenses, while a stop is disposed between the two concave lenses. In particular, the following conditional expressions are satisfied:

$$0.10 < D_S/f < 0.23$$

$$0.82 < R_5/|R_6| < 1.3$$

$$0.0012 < \Sigma(\phi_i \cdot \delta\theta_i) < 0.0045$$

where $\phi$ is refracting power, and $\delta\theta$ is anomalous dispersion. A glass material having anomalous dispersion is appropriately disposed, and an appropriate air gap is provided between the two concave lenses, thus making it possible to use a lens having a high refracting power, thereby effectively correcting axial chromatic aberration in particular and securing high performances in a wide wavelength range.

6 Claims, 29 Drawing Sheets

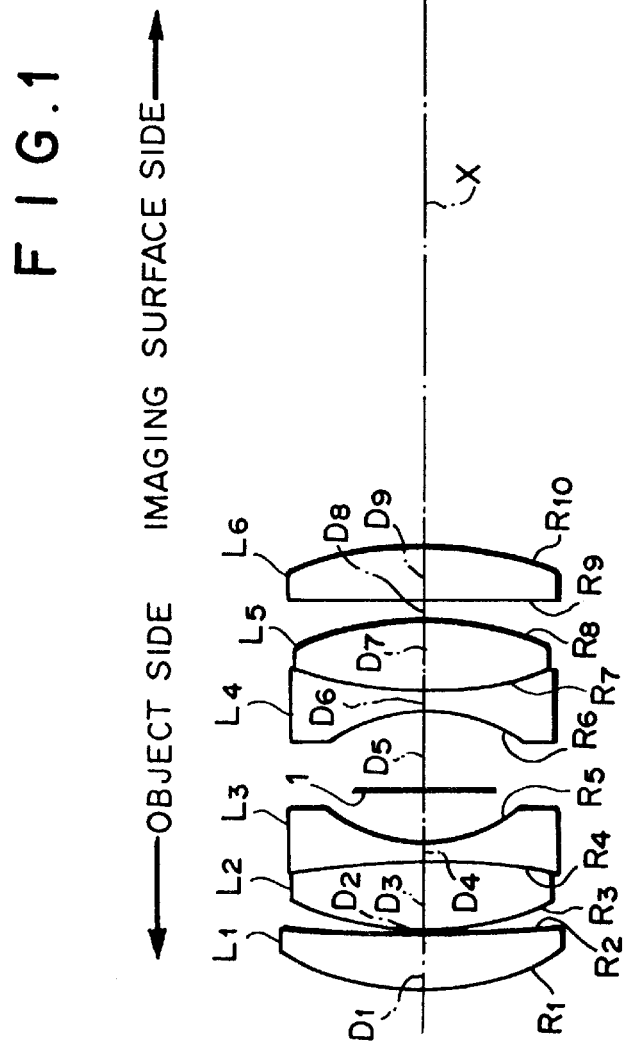

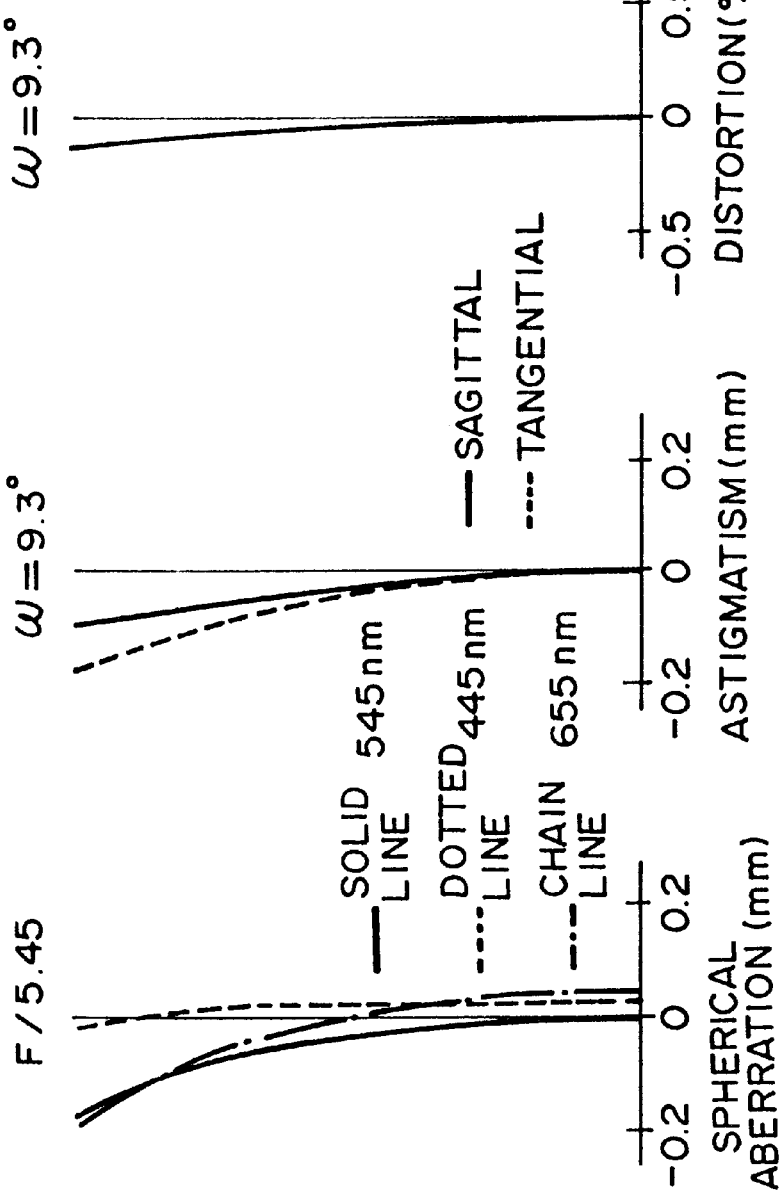

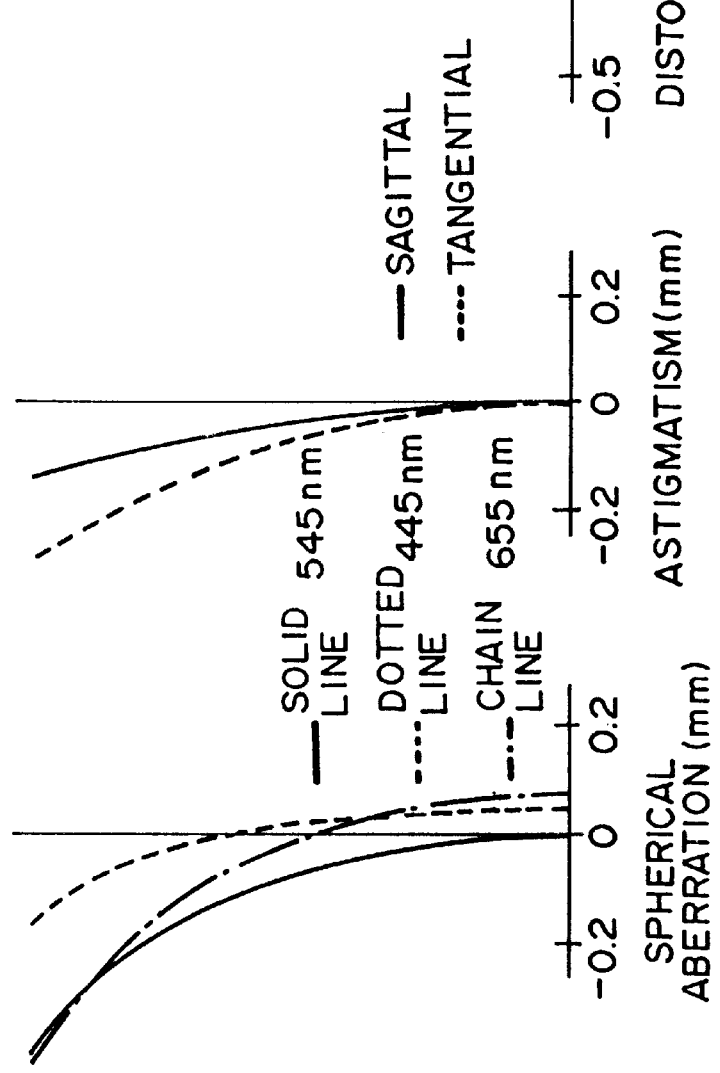

EXAMPLE 1
−1/2.5 X
TANGENTIAL     COMA     SAGITTAL
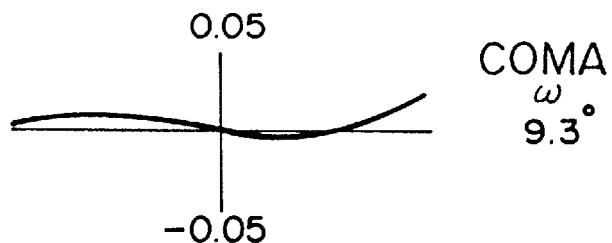
ω 9.3°
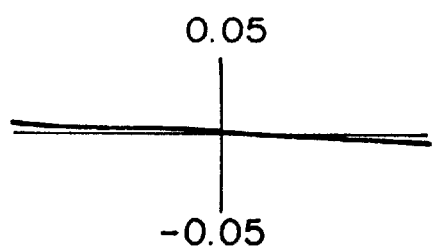
F I G.4A        F I G.4E
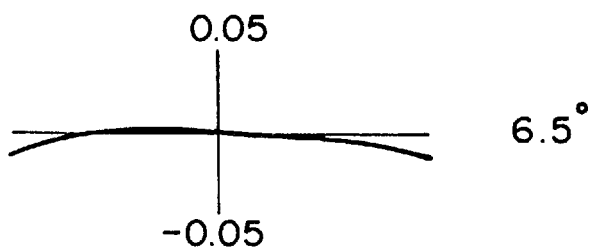
6.5°
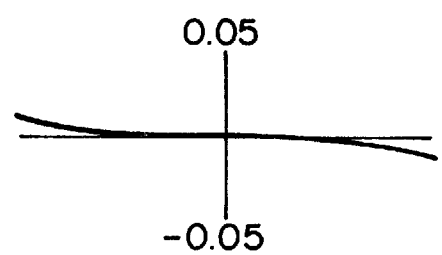
F I G.4B        F I G.4F
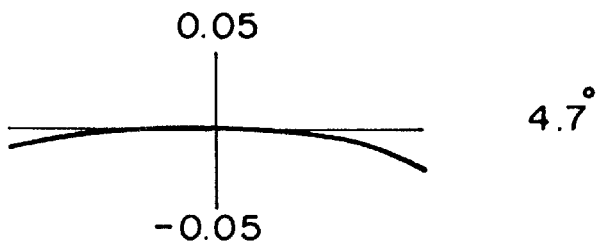
4.7°
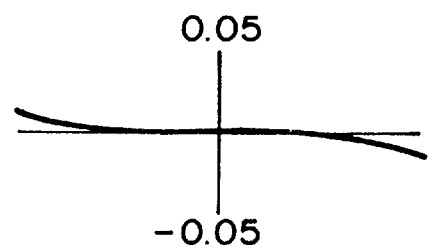
F I G.4C        F I G.4G
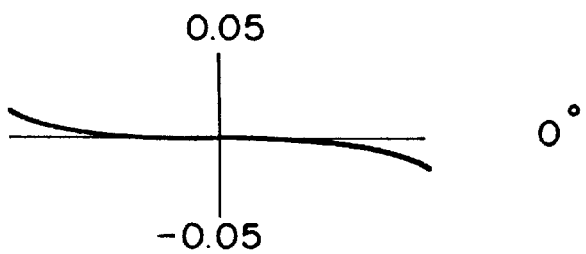
0°
F I G.4D EXAMPLE 1
−1/1.25 X
TANGENTIAL                COMA                SAGITTAL
                            ω
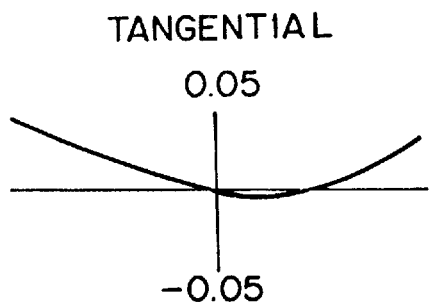
F I G. 5A
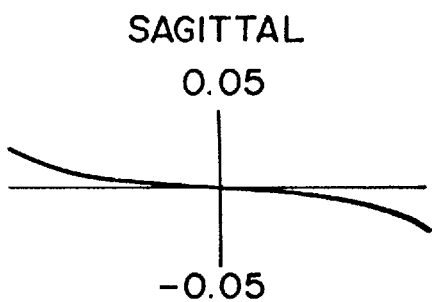
F I G. 5E
6.3°
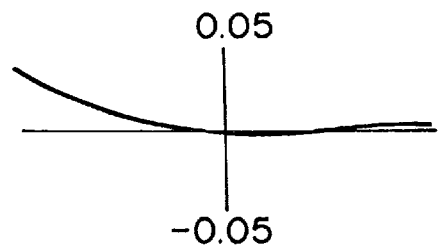
F I G. 5B
4.4°
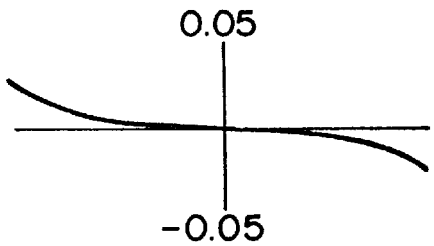
F I G. 5F
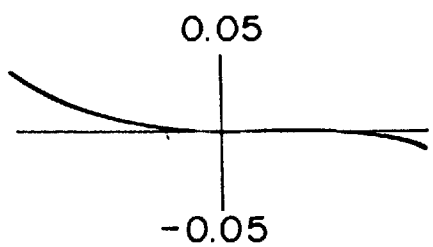
F I G. 5C
3.1°
F I G. 5G
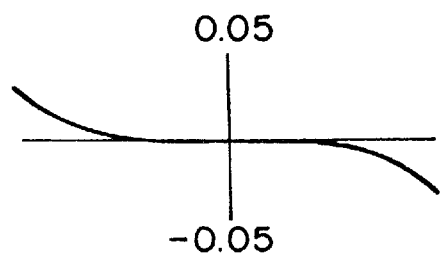
F I G. 5D
0°

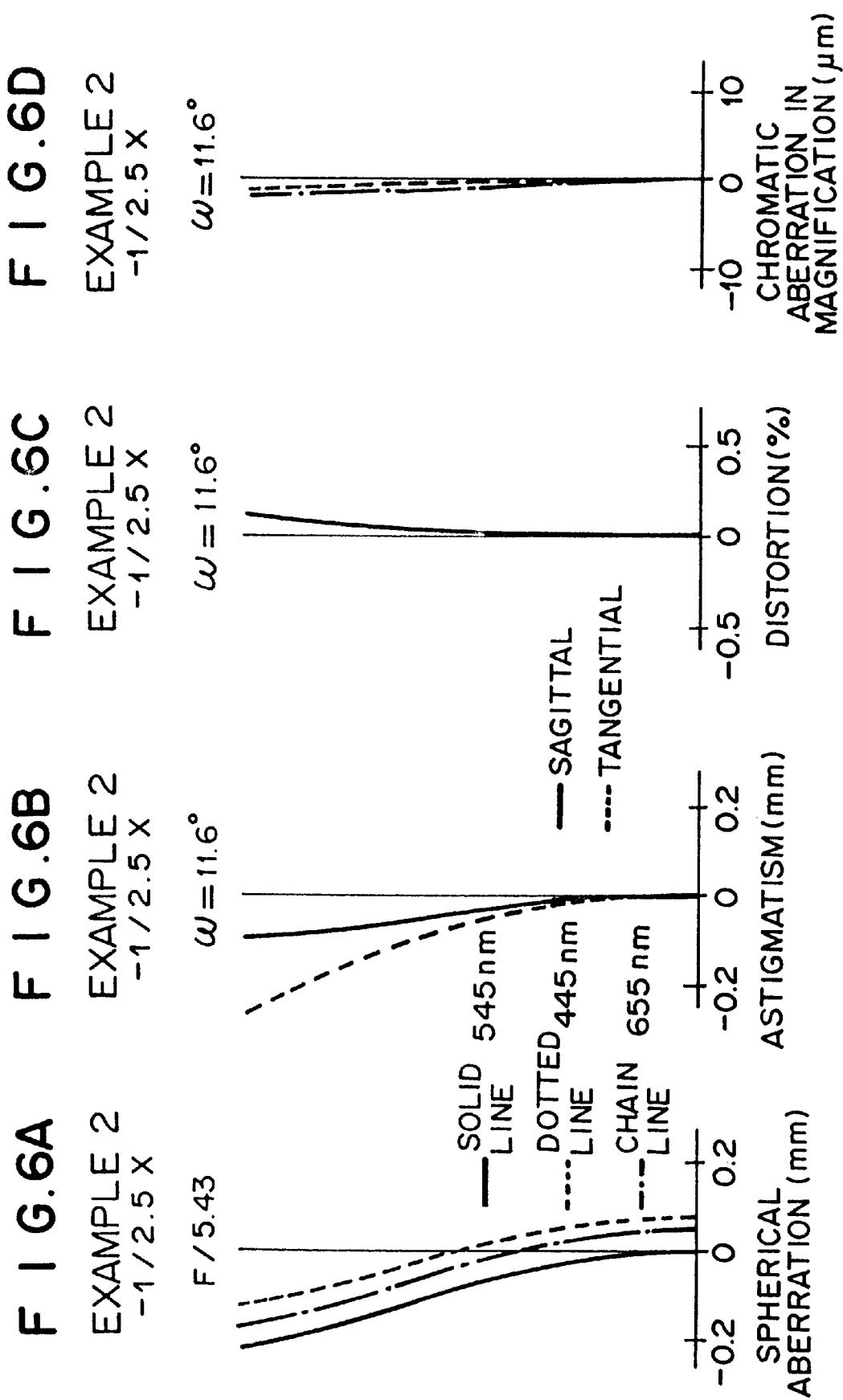

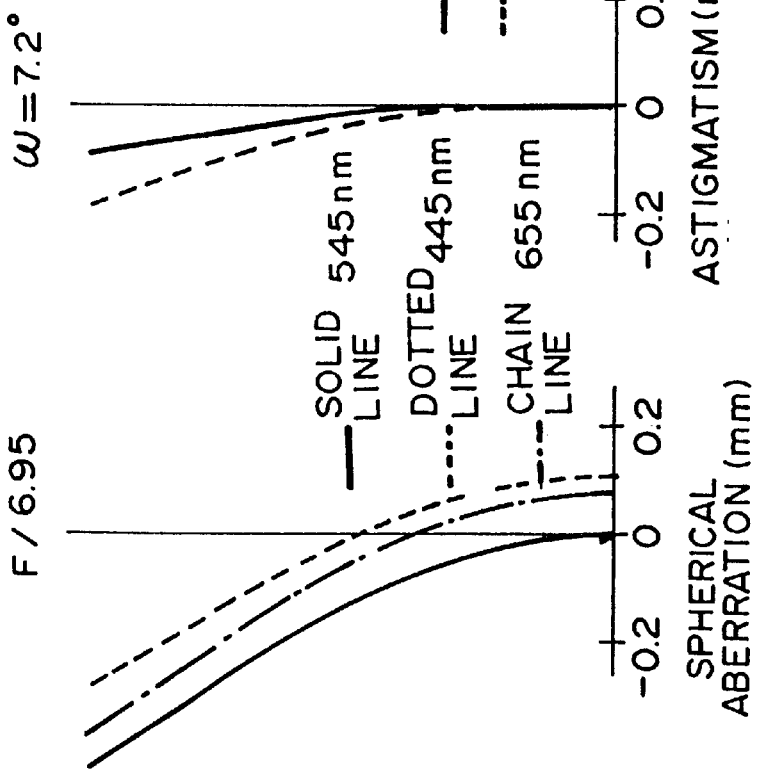

EXAMPLE 2
−1/2.5 X
TANGENTIAL     COMA     SAGITTAL
ω
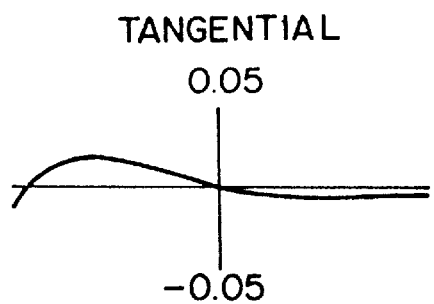
FIG.8A
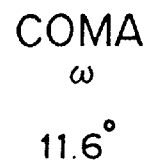
11.6°
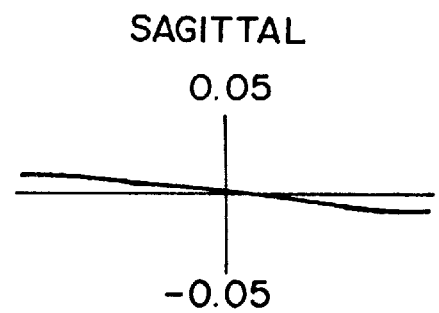
FIG.8E
FIG.8B
8.2°
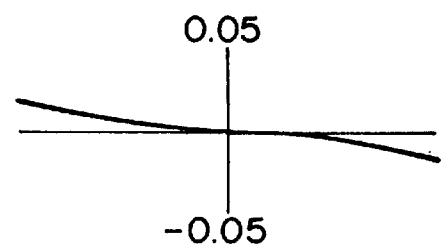
FIG.8F
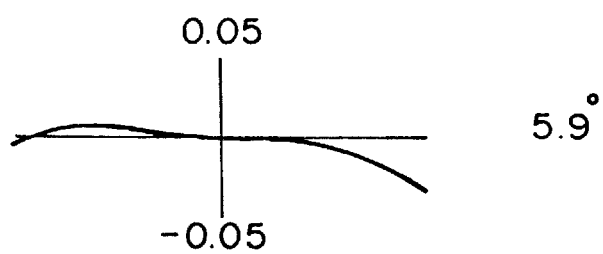
FIG.8C
5.9°
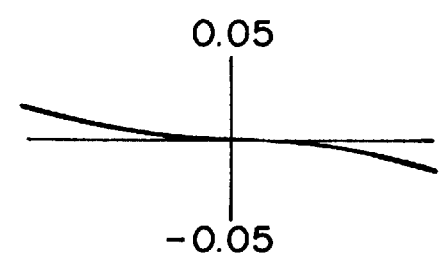
FIG.8G
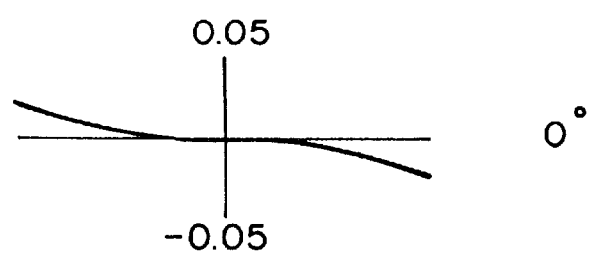
FIG.8D
0°

EXAMPLE 2
−1/1.25 X

TANGENTIAL COMA ω SAGITTAL 7.2°

5°

3.6°

0°

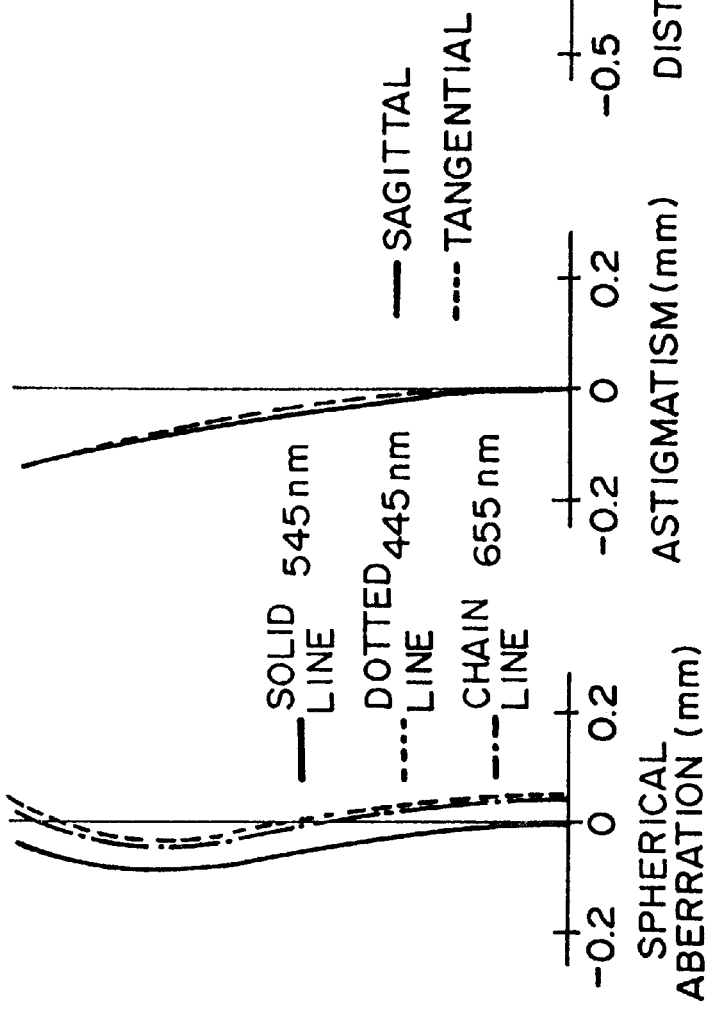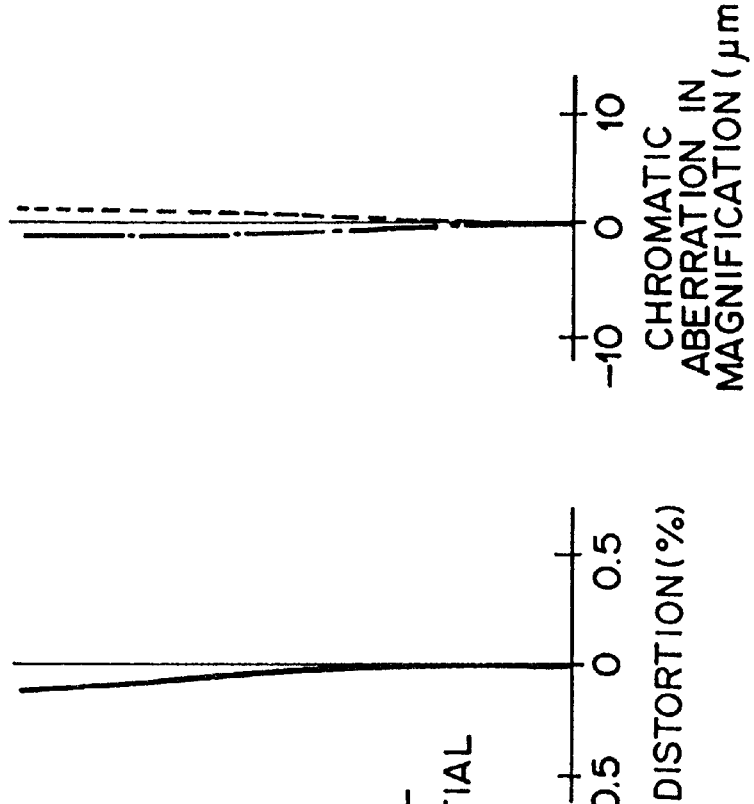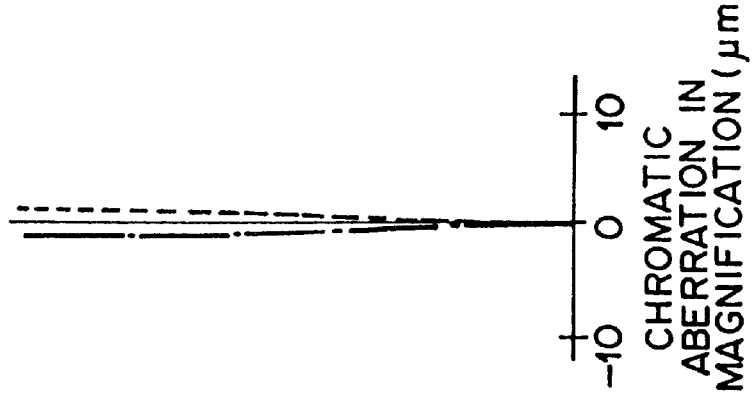

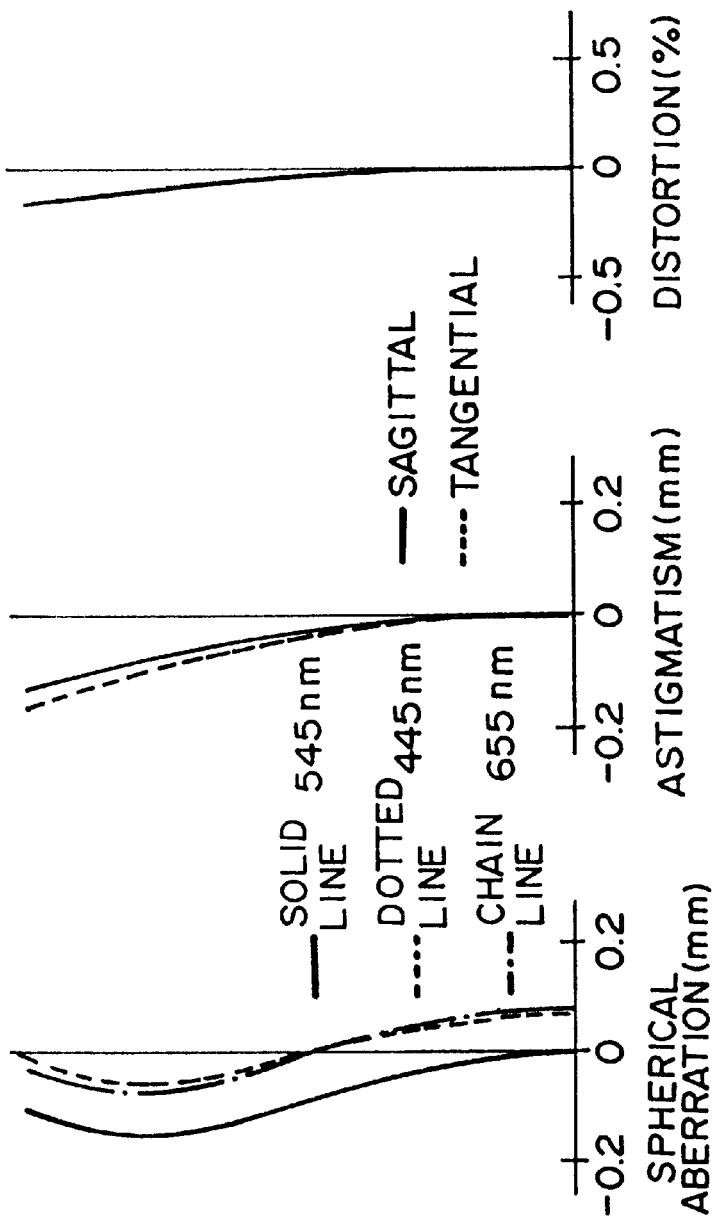

EXAMPLE 3
−1/2.5X

EXAMPLE 3
−1/1.25 X

TANGENTIAL     COMA     SAGITTAL $\omega$ 6.9°

4.8°

3.5°

0°

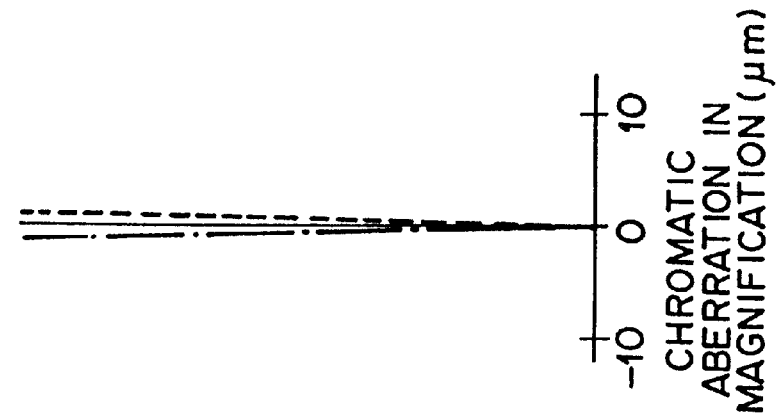
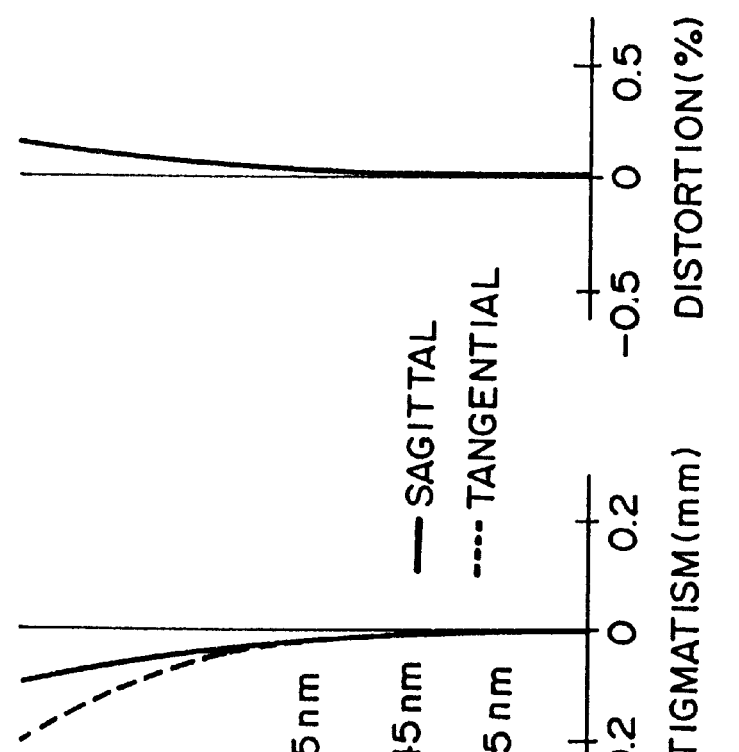
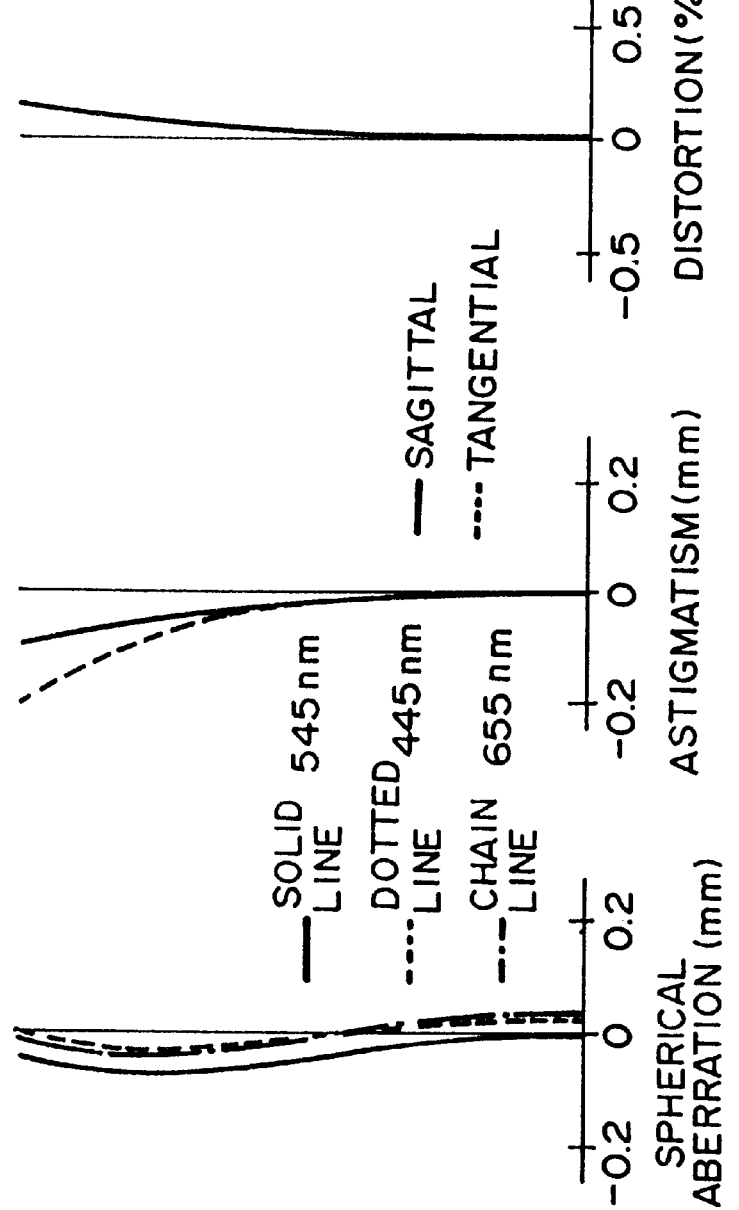

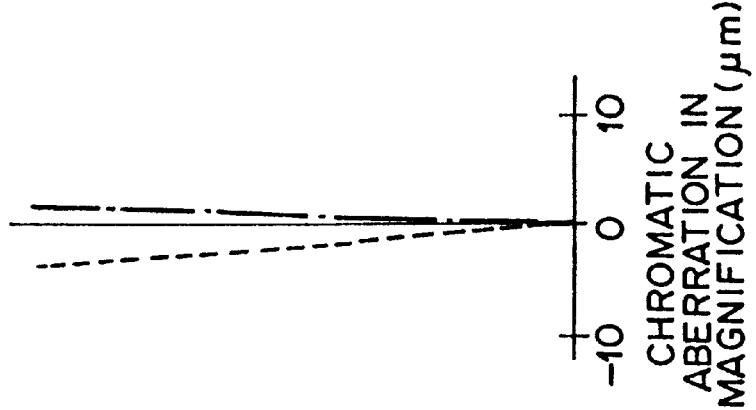
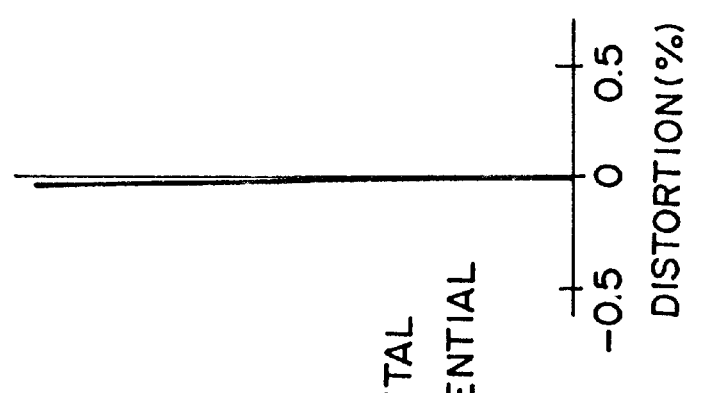
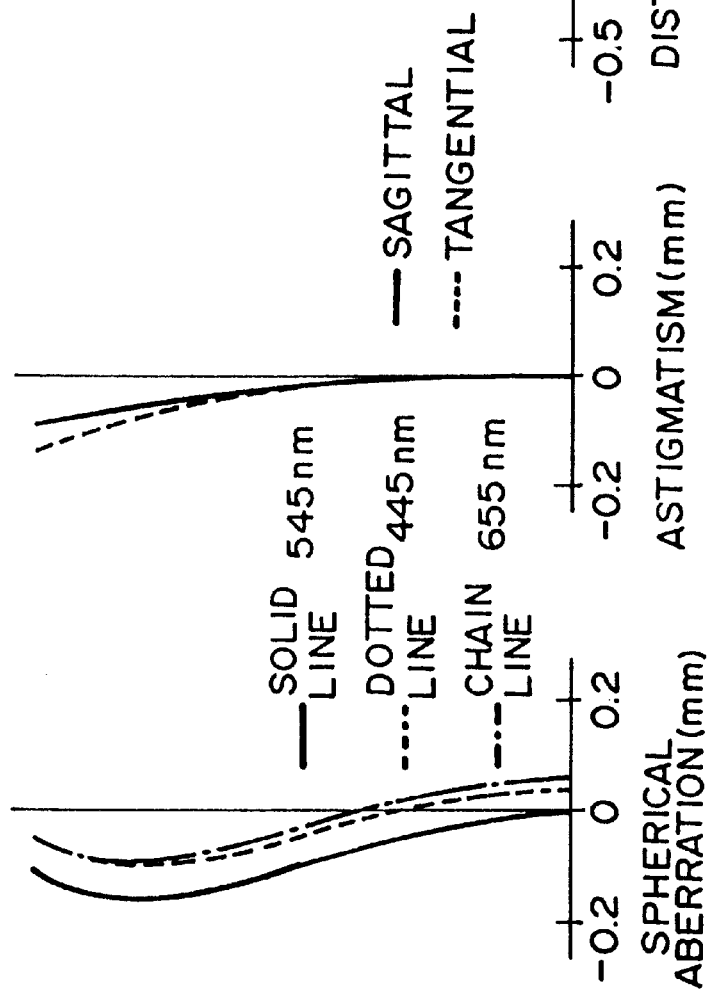

EXAMPLE 4
−1/2.5 X
TANGENTIAL COMA SAGITTAL
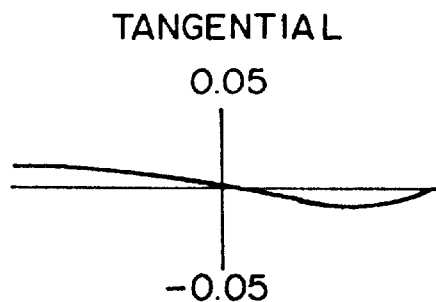
FIG.16A
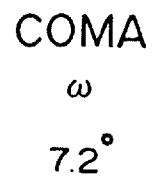
ω
7.2°
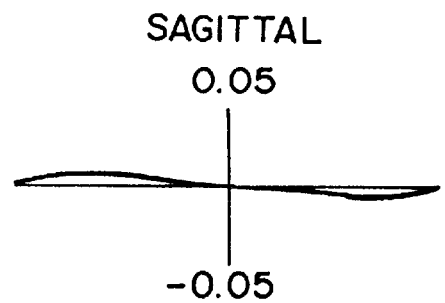
FIG.16E
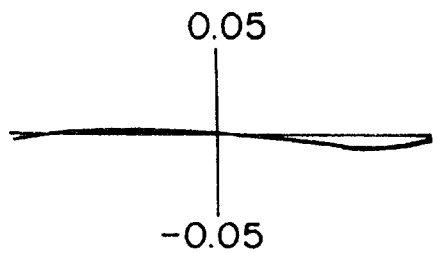
FIG.16B
5°
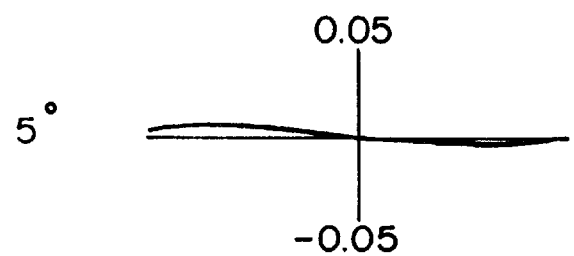
FIG.16F
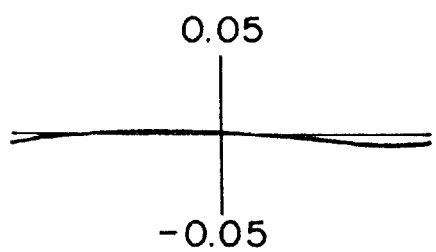
FIG.16C
3.6°
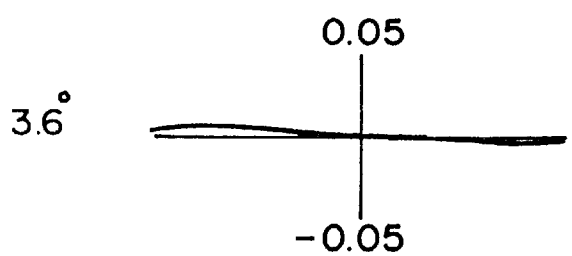
FIG.16G
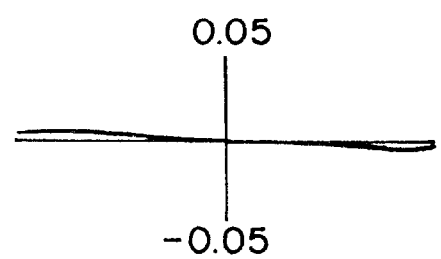
FIG.16D
0°

EXAMPLE 4
−1/1.25 X
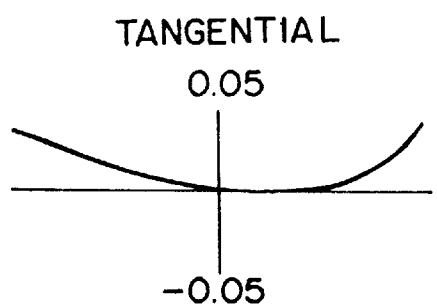
FIG. 17A (TANGENTIAL, ω = 5.5°)
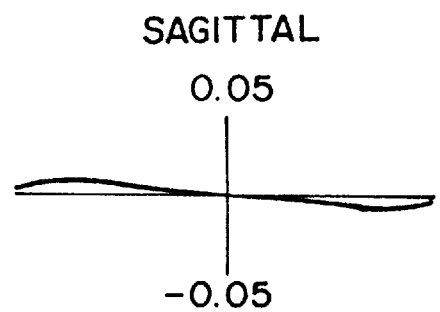
FIG. 17E (SAGITTAL)
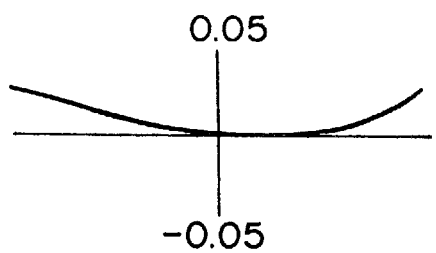
FIG. 17B (3.9°)
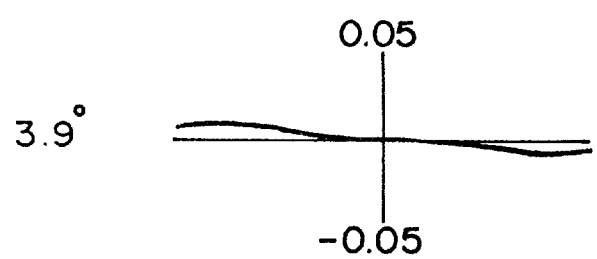
FIG. 17F
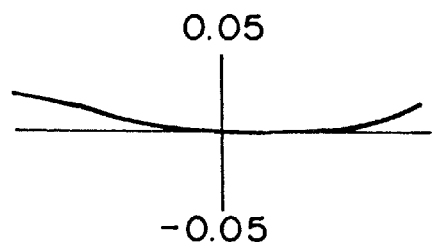
FIG. 17C (2.8°)
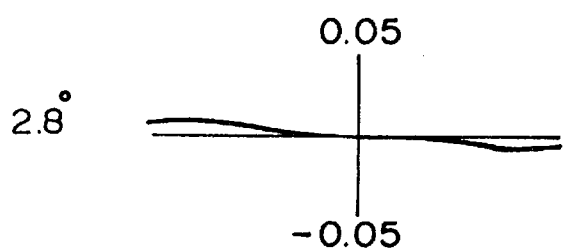
FIG. 17G
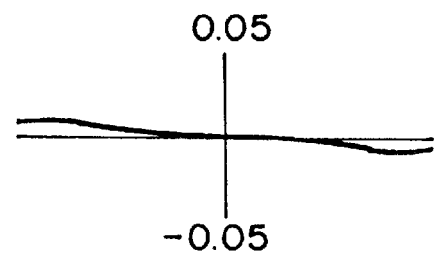
FIG. 17D (0°)
COMA

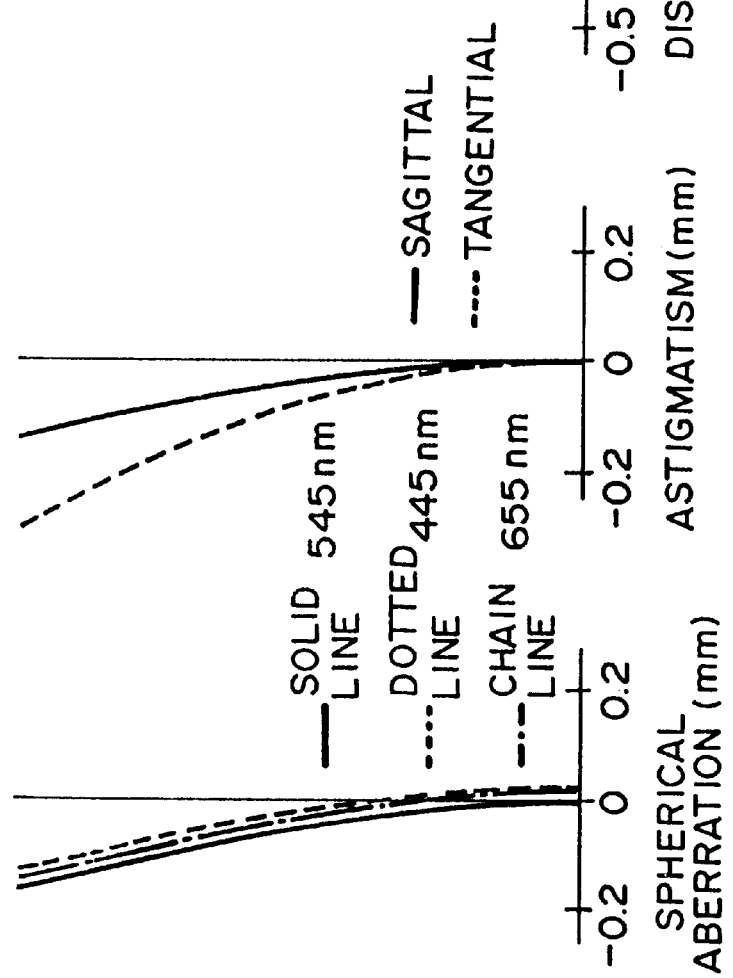
FIG.18A Example 5 −1/2.5× F/5.48
FIG.18B Example 5 −1/2.5× ω=8.1°
FIG.18C Example 5 −1/2.5× ω=8.1°
FIG.18D Example 5 −1/2.5× ω=8.1°

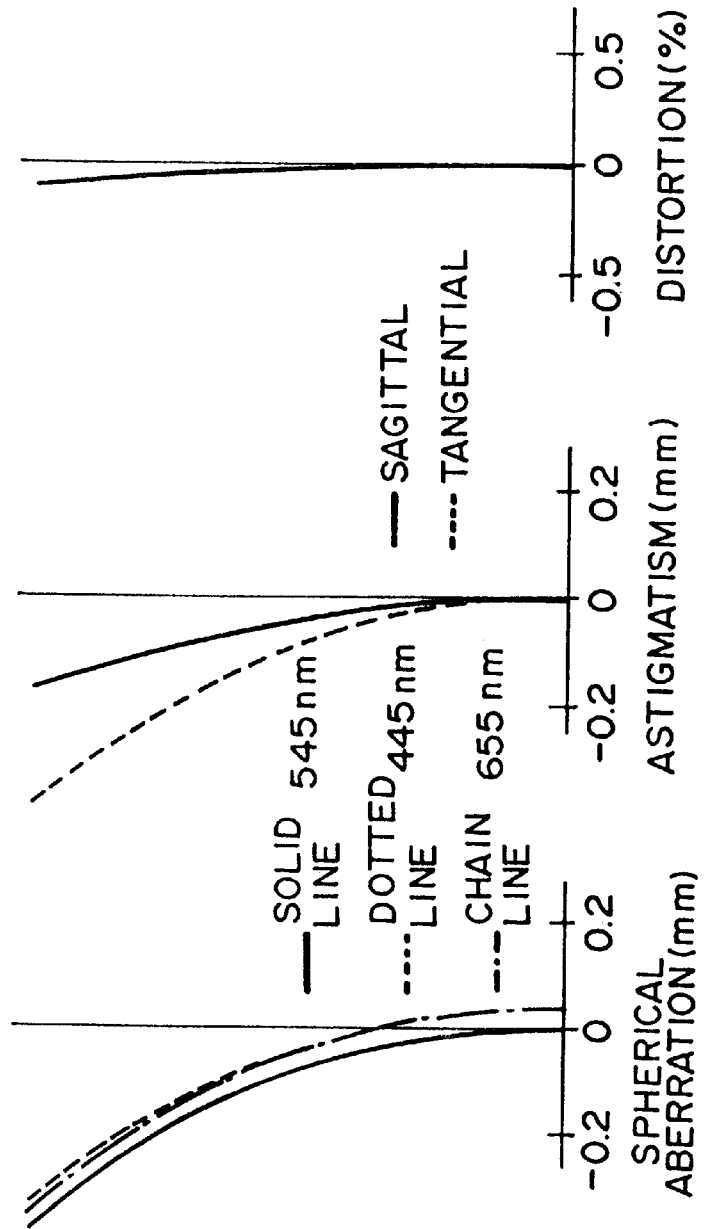

EXAMPLE 5
−1/2.5X
TANGENTIAL COMA SAGITTAL
ω
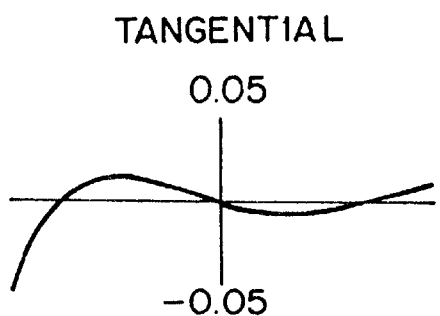
FIG.20A
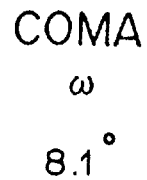
8.1°
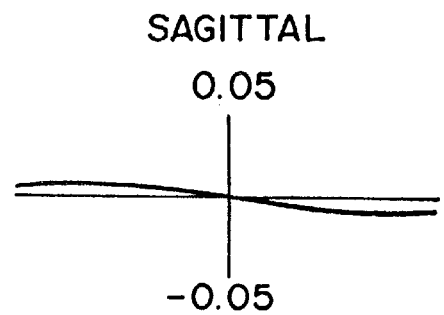
FIG.20E
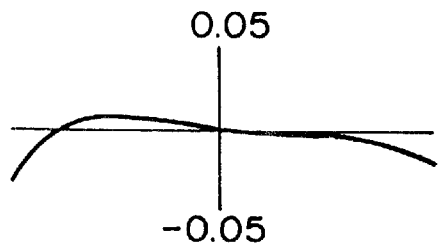
FIG.20B
5.7°
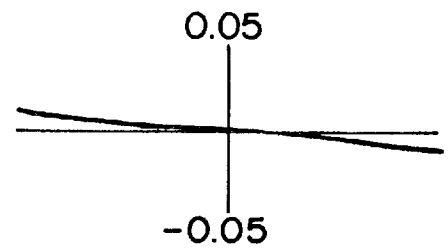
FIG.20F
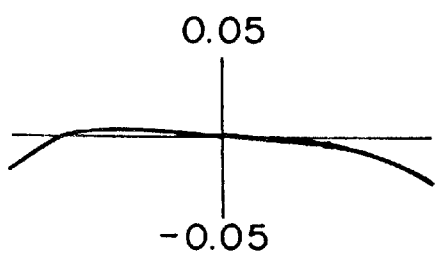
FIG.20C
4.1°
FIG.20G
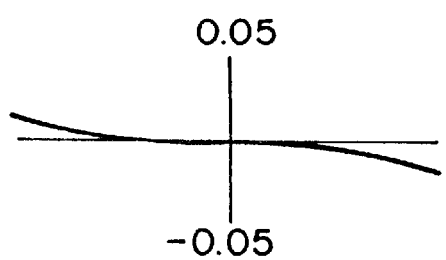
FIG.20D
0°

EXAMPLE 5
−1 / 1.25 X
COMA
ω
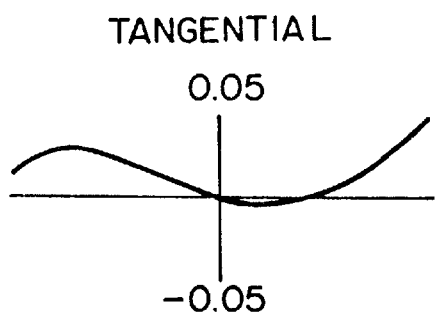
TANGENTIAL
FIG.21A  (6.4°)
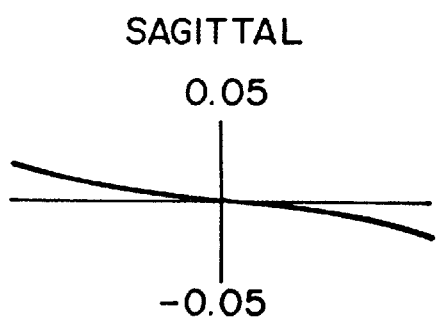
SAGITTAL
FIG.21E
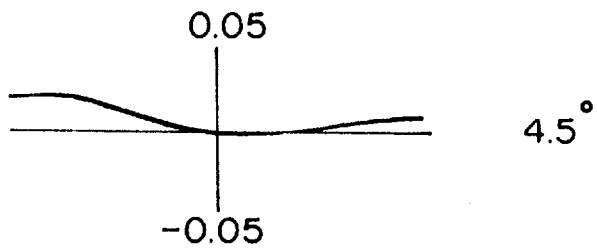
FIG.21B  (4.5°)
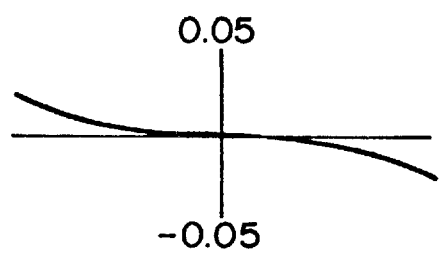
FIG.21F
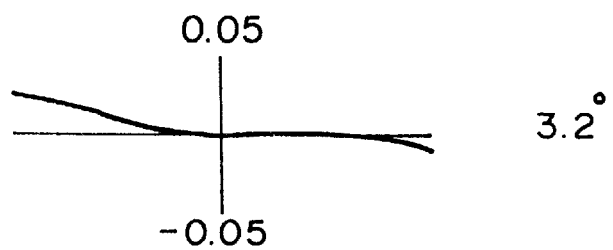
FIG.21C  (3.2°)
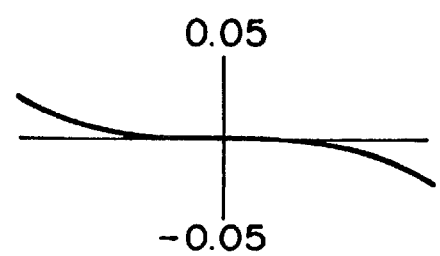
FIG.21G
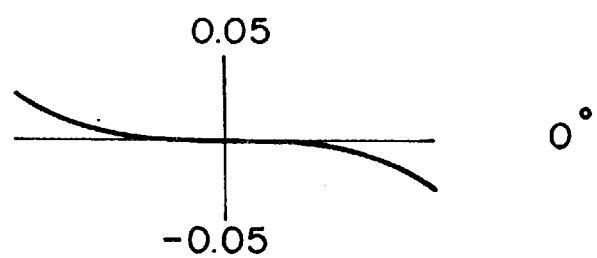
FIG.21D  (0°)

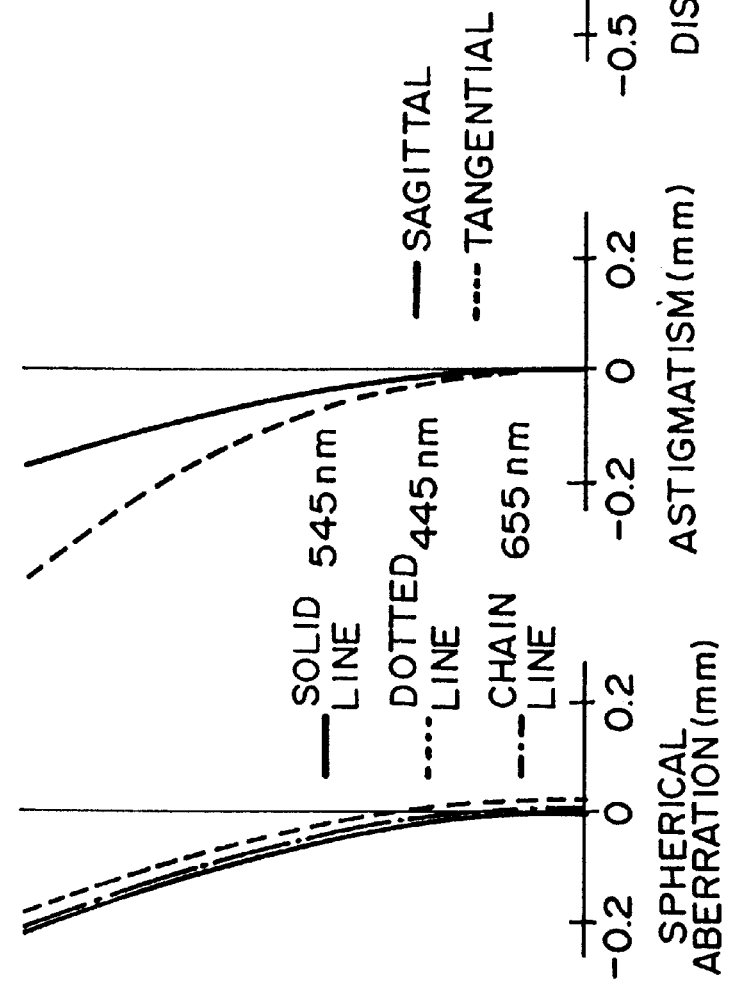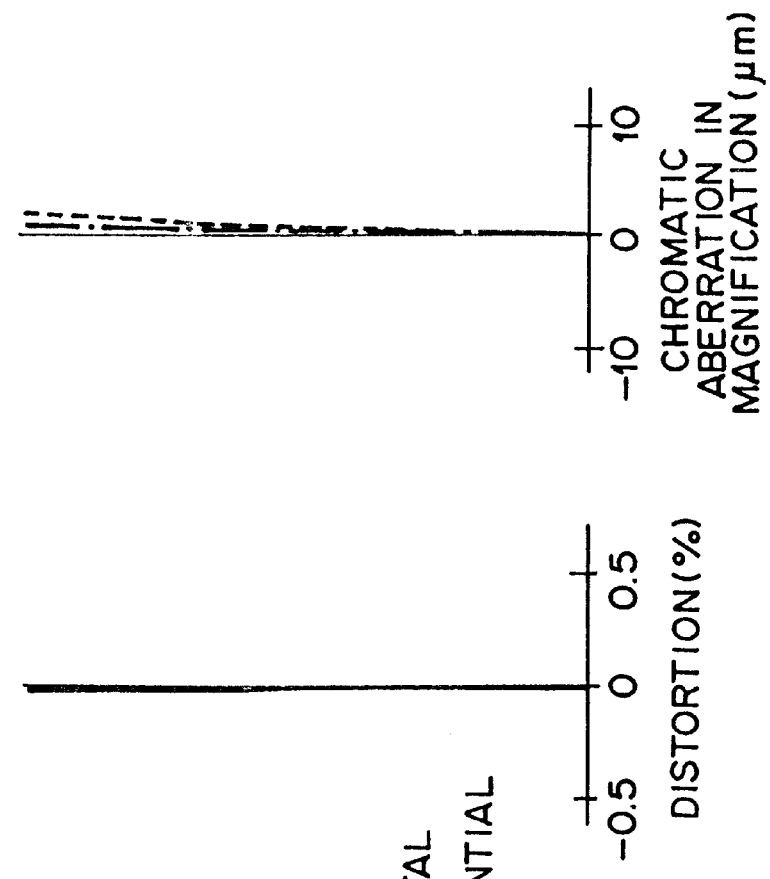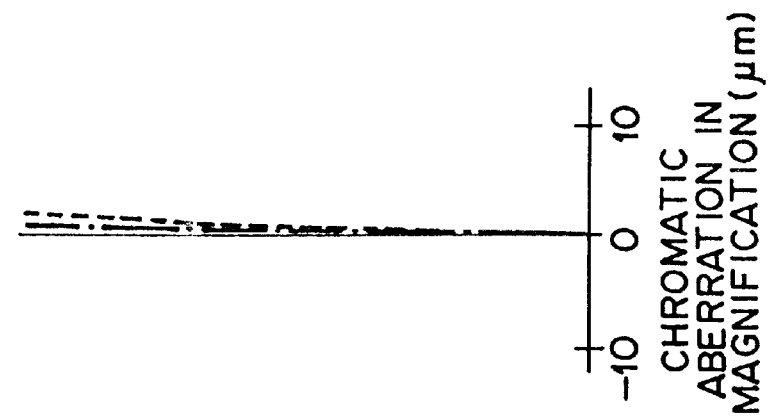

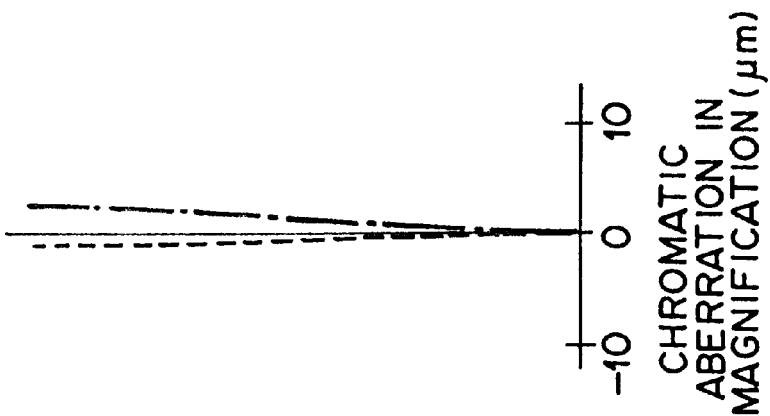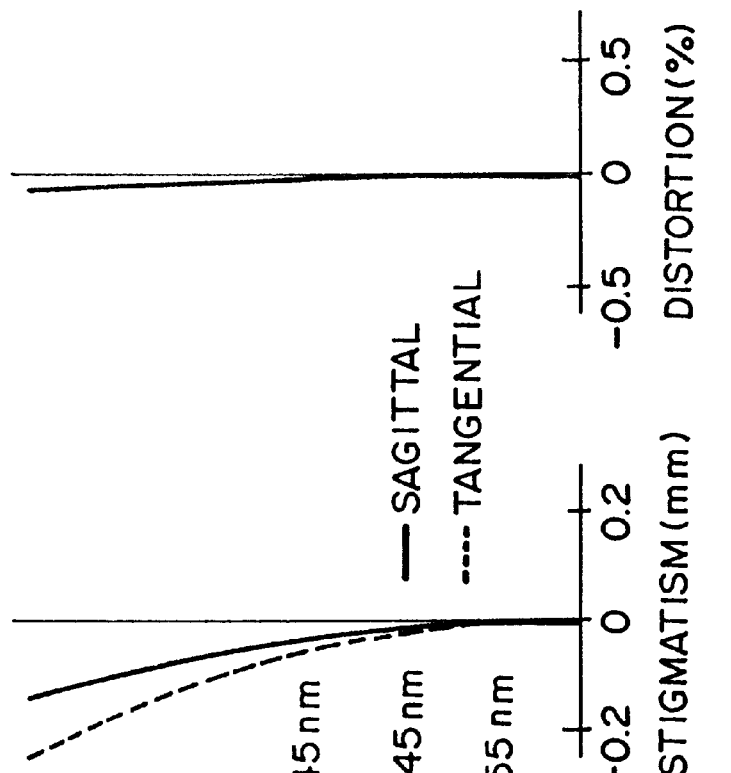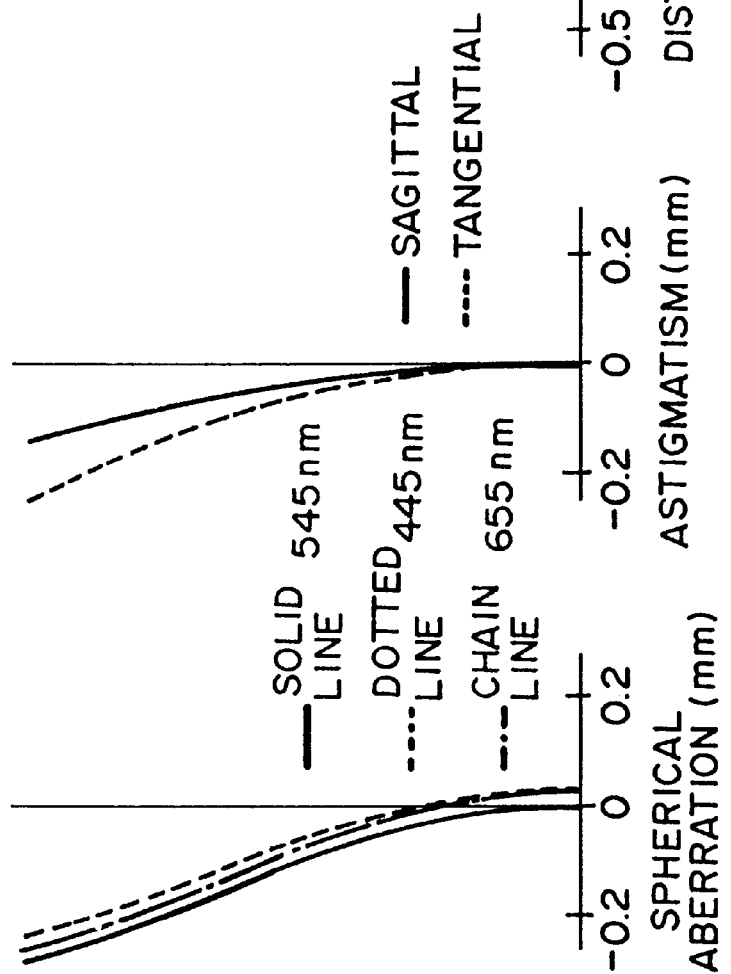

EXAMPLE 6
−1/2.5 X

COMA ω

8°

5.6°

4°

0°

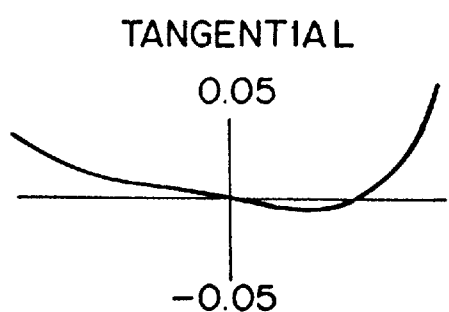
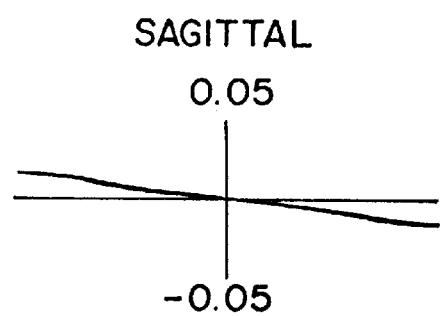
FIG.25A — FIG.25E
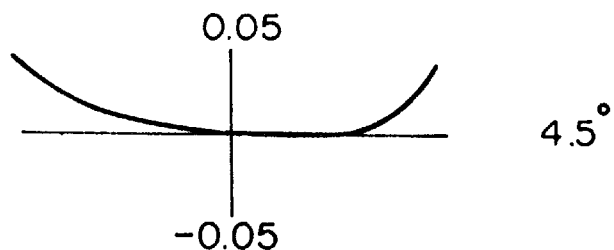
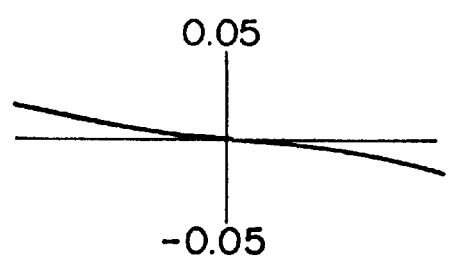
FIG.25B — FIG.25F
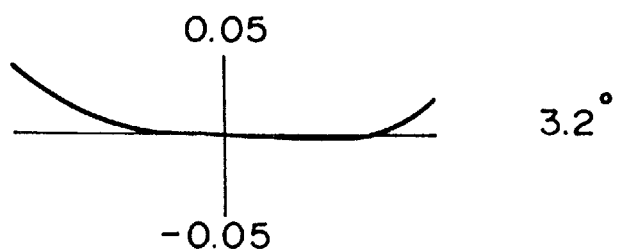
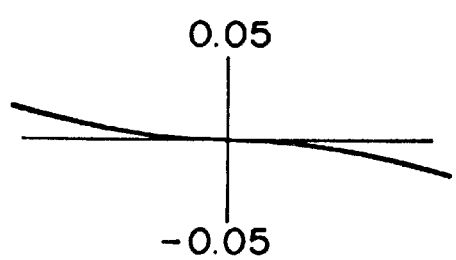
FIG.25C — FIG.25G
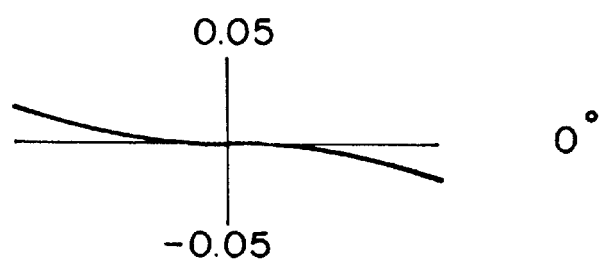
FIG.25D

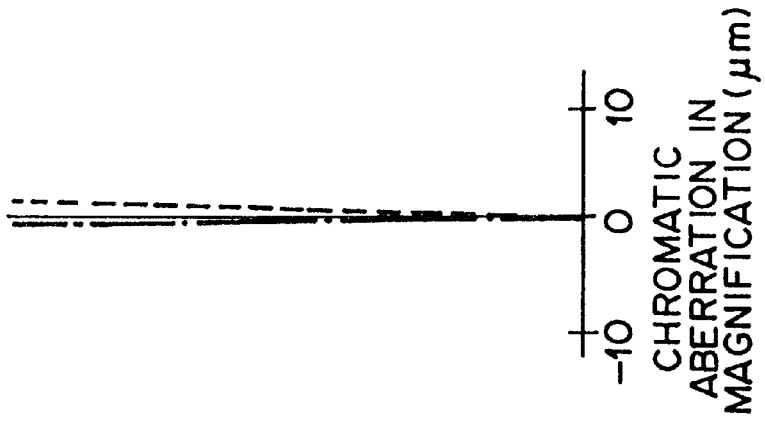
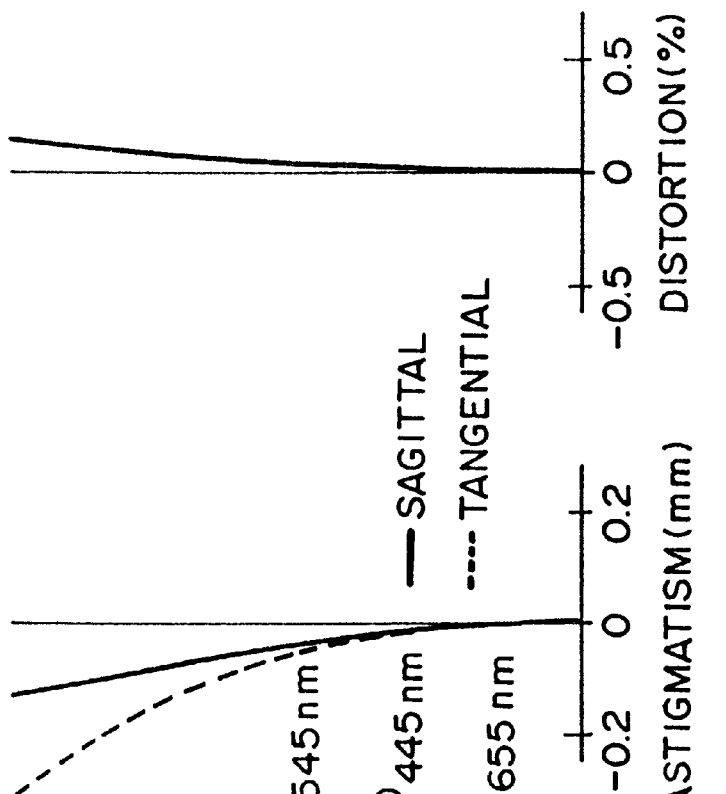
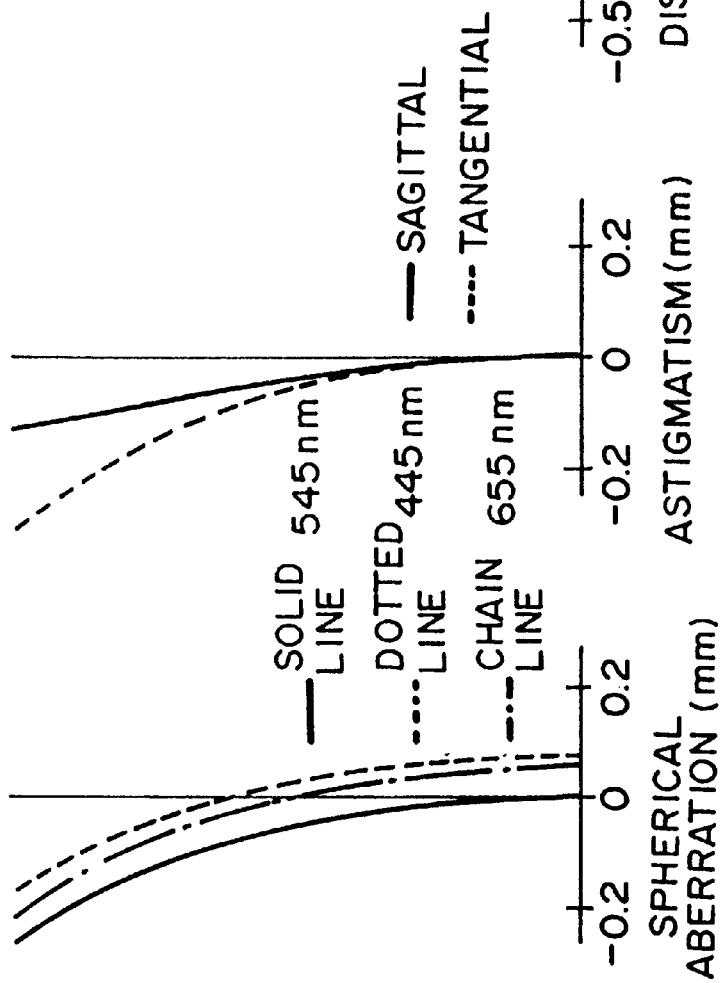

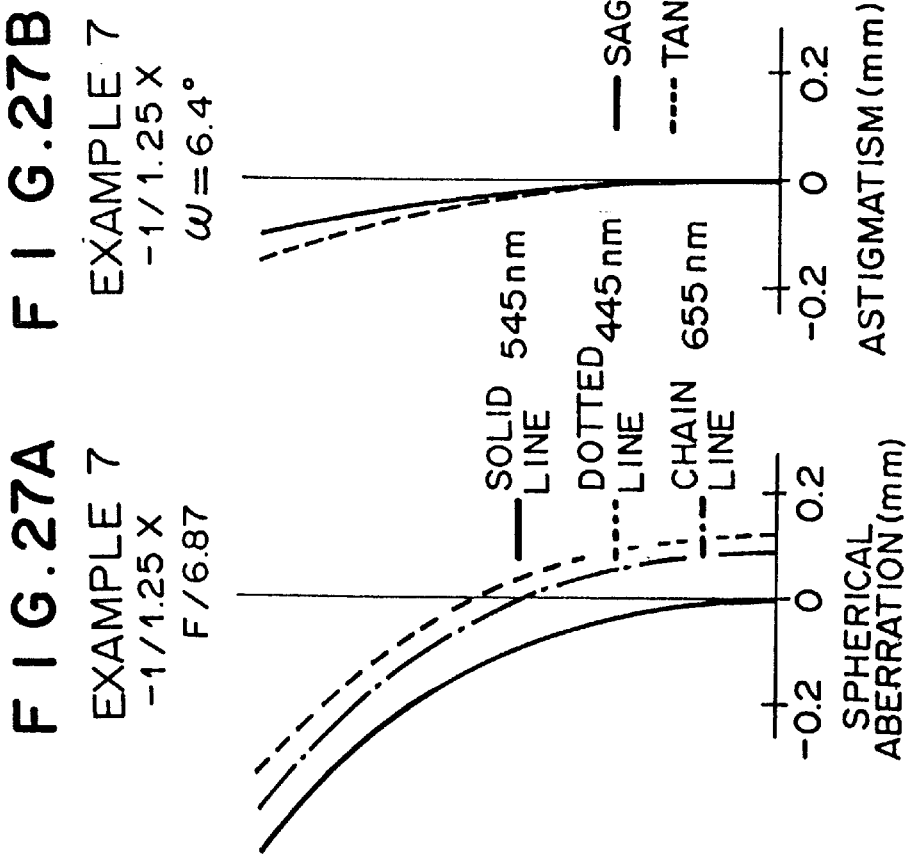

EXAMPLE 7
−1/2.5 X
TANGENTIAL     COMA     SAGITTAL
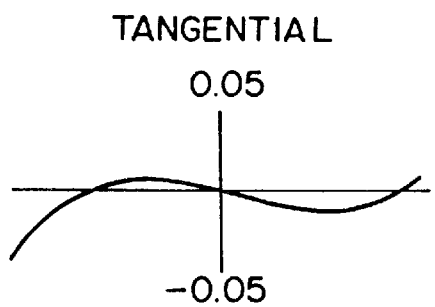
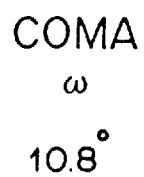
ω
10.8°
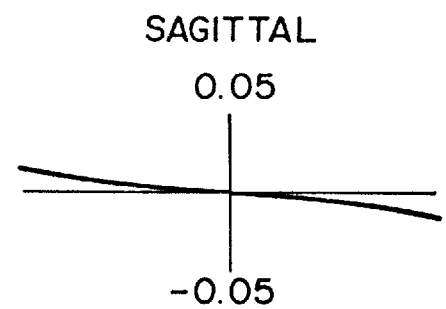
FIG.28A          FIG.28E
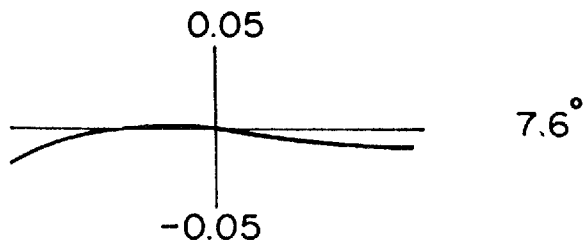
7.6°
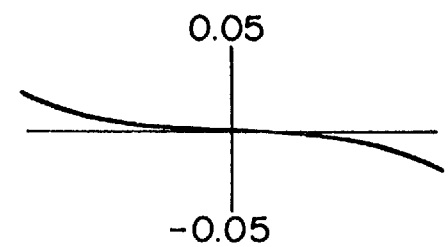
FIG.28B          FIG.28F
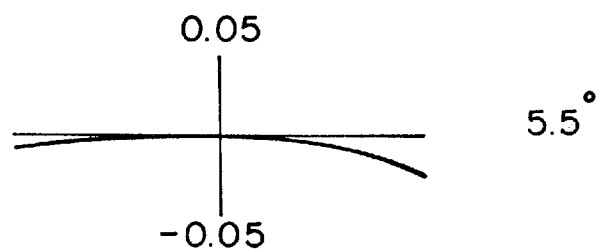
5.5°
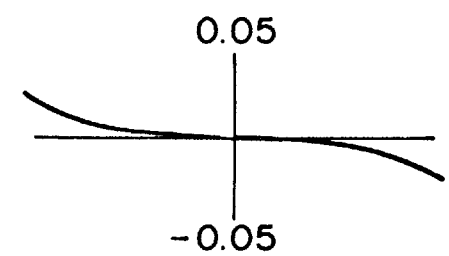
FIG.28C          FIG.28G
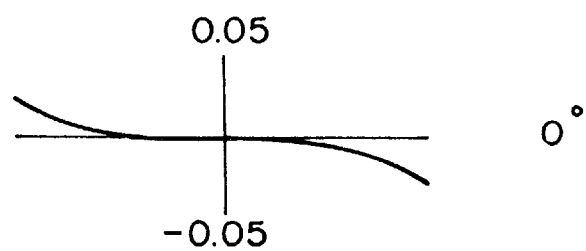
0°
FIG.28D

EXAMPLE 7
−1/1.25 X
TANGENTIAL COMA SAGITTAL
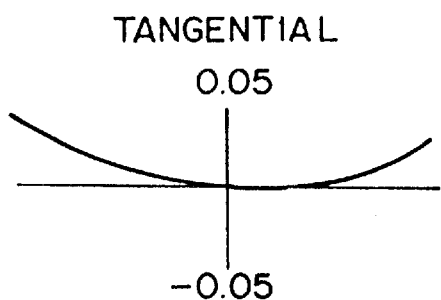
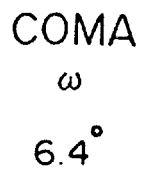
ω
6.4°
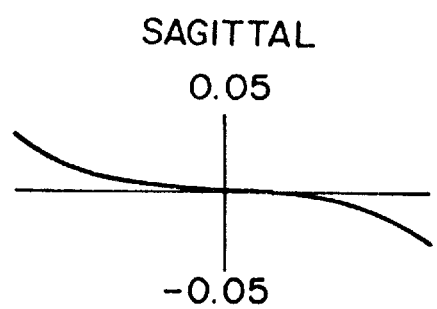
FIG.29A  FIG.29E
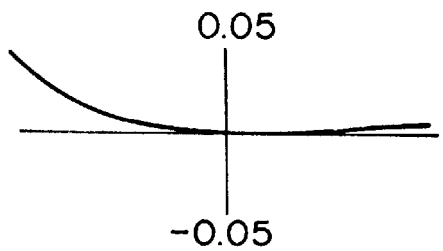
4.5°
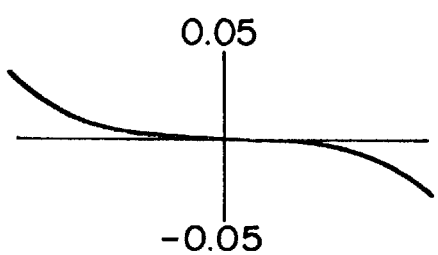
FIG.29B  FIG.29F
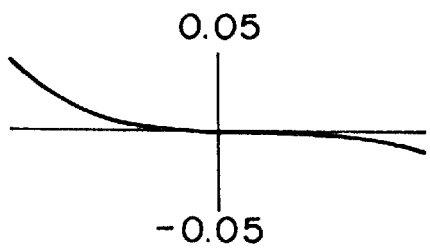
3.2°
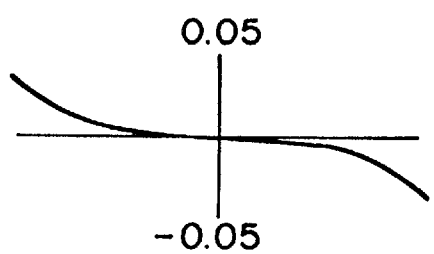
FIG.29C  FIG.29G
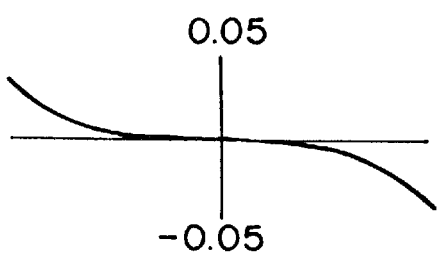
0°
FIG.29D

COLOR-IMAGE-READING GAUSSIAN LENS

RELATED APPLICATIONS

This application claims the priority of Japanese Patent Application No. 9-281459 filed on Sep. 29, 1997, which is incorporated herein by reference.

BACKGROUND OF THE INVENTION

1. Field of the Invention

The present invention relates to a Gaussian lens for reading out color images and color originals; and, in particular, to a color-original-reading Gaussian lens which is useful for reading out images of negative and positive films at a low magnification within the range of $-1/2.5\times$ to $-1/1.25\times$.

2. Description of the Prior Art

Prevailing in recent years are developing machines known as "minilab" or "digital lab." These machines do not directly print images onto paper from films but, after reducing the film images through a lens and once capturing them onto a solid-state imaging device such as CCD so as to allow them to be subjected to various kinds of processing, print them on paper by use of laser or the like. In such machines, as their image-reading optical systems for forming images onto the solid-state imaging device, those having a high resolution are required since light-receiving devices have a high density.

On the other hand, when reading out color originals, it is necessary to obtain good images in a wide wavelength range, and it is desirable that such performances as magnification and resolution be maintained at similarly high levels among three wavelength bands of blue, green, and red. Specifically, it is necessary for the individual colors to have low chromatic aberration levels, so that imaging points from the center to peripheries align with each other with high contrast.

In general, for correcting chromatic aberration, anomalous dispersion glass materials for lenses have been in use. As Gaussian lenses proposed for correcting chromatic aberration, those disclosed in Japanese Unexamined Patent Publication Nos. 57-108817, 62-94810, 2-124507, 4-163508, and 4-311912 have been known.

The lenses disclosed in the above-mentioned publications are either those yielding an insufficient absolute value of axial chromatic aberration correcting amount or those suitably used at a relatively high magnification of $-1/10\times$ to $-1/5\times$, thus leaving a problem in that they may not sufficiently exhibit high performances when used at a low magnification.

This problem results from the fact that the amount of occurrence of axial chromatic aberration ($\Delta S$) in a lens has a relationship of $\Delta S = \gamma(1-\beta)^2 \cdot f$ (where $\gamma$ is a constant) with respect to the focal length f of the lens and the imaging magnification $\beta(\beta<0)$ thereof, thereby becoming greater as the focal length f is longer or the absolute value $|\beta|$ of the imaging magnification $\beta$ is greater.

SUMMARY OF THE INVENTION

In view of such circumstances, it is an object of the present invention to provide a color-image-reading Gaussian lens used, at a low magnification of $-1/2.5\times$ to $-1/1.25\times$, for reading out color images and color originals such as negative or positive films in particular, which can effectively correct axial chromatic aberration in particular, thereby being capable of exhibiting high performances in a wide wavelength range.

The color-image-reading Gaussian lens in accordance with the first aspect of the present invention is constituted by six lens sheets comprising, successively from an object side, first and second lenses each made of a convex lens, third and fourth lenses each made of a concave lens, and fifth and sixth lenses each made of a convex lens; and a stop disposed between the third and fourth lenses, wherein the following conditional expressions (1) to (3) are satisfied:

$$65 < \nu_2, \nu_5 \tag{1}$$

$$\delta\theta_2, \delta\theta_5 > 0.004 \tag{2}$$

$$0.0012 < \Sigma(\phi_i \cdot \delta\theta_i) < 0.0045 \tag{3}$$

where $\nu_2$ is the $\nu$ value of the second lens with respect to d-line;

$\nu_5$ is the $\nu$ value of the fifth lens with respect to d-line;

$\delta\theta_2$ is the anomalous dispersion of the second lens;

$\delta\theta_5$ is the anomalous dispersion of the fifth lens;

$\phi_i$ is the refracting power of the i-th lens (wherein i=1 to 6); and $\delta\theta_i$ is the anomalous dispersion of the i-th lens (wherein i=1 to 6).

Preferably, this Gaussian lens further satisfies the following conditional expressions (4) to (7):

$$1.5 \cdot R_5 < (R_1 + R_3)/2 < 2.6 \cdot R_5 \tag{4}$$

$$1.5 \cdot R_6 < (R_8 + R_{10})/2 < 3.0 \cdot R_6 \tag{5}$$

$$0.10 < D_5/f < 0.23 \tag{6}$$

$$0.82 < R_5/|R_6| < 1.3 \tag{7}$$

where $R_5$ is the radius of curvature of the image-side surface of the third lens;

$R_1$ is the radius of curvature of the object-side surface of the first lens;

$R_3$ is the radius of curvature of the object-side surface of the second lens;

$R_6$ is the radius of curvature of the object-side surface of the fourth lens;

$R_8$ is the radius of curvature of the image-side surface of the fifth lens;

$R_{10}$ is the radius of curvature of the image-side surface of the sixth lens;

$D_5$ is the air gap between the third and fourth lenses; and f is the focal length of the whole lens system.

Preferably, in the Gaussian lens, at least one of the third and fourth lenses satisfies the following conditional expressions (8) and (9):

$$35 < \nu_N < 50 \tag{8}$$

$$\delta\theta_N < -0.004 \tag{9}$$

where, assuming N to be the number of the lens satisfying the conditional expressions (8) and (9) in the third and fourth lenses, $\nu_N$ is the $\nu$ value of the N-th lens with respect to d-line; and $\delta\theta_N$ is the anomalous dispersion of the N-th lens.

Preferably, in the Gaussian lens, at least one of the first and sixth lenses satisfies the following conditional expression (10):

$$\delta\theta_P < -0.002 \quad (10)$$

where, assuming P to be the number of the lens satisfying the conditional expression (10), $\delta\theta_P$ is the anomalous dispersion of the P-th lens.

The color-image-reading Gaussian lens in accordance with the second aspect of the present invention is constituted by six lens sheets comprising, successively from an object side, first and second lenses each made of a convex lens, third and fourth lenses each made of a concave lens, and fifth and sixth lenses each made of a convex lens; and a stop disposed between the third and fourth lenses, wherein the following conditional expressions (11), (12), and (3) are satisfied:

$$35 < \nu_3, \nu_4 < 50 \quad (11)$$

$$\delta\theta_3 \cdot \delta\theta_4 < -0.01 \quad (12)$$

$$0.0012 < \Sigma(\phi_i \cdot \delta\theta_i) < 0.0045 \quad (3)$$

where $\nu_3$ is the $\nu$ value of the third lens with respect to d-line;

$\nu_4$ is the $\nu$ value of the fourth lens with respect to d-line;

$\delta\theta_3$ is the anomalous dispersion of the third lens;

$\delta\theta_4$ is the anomalous dispersion of the fourth lens;

$\phi_i$ is the refracting power of the i-th lens (wherein i=1 to 6); and $\delta\theta_i$ is the anomalous dispersion of the i-th lens (wherein i=1 to 6); and wherein at least one of the first, second, fifth, and sixth lenses satisfies the following condition (13):

$$\delta\theta_M > 0.0 \quad (13)$$

where, assuming that M to be the number of the lens satisfying the conditional expression (13) in the first, second, fifth, and sixth lenses, $\delta\theta_M$ is the anomalous dispersion of the M-th lens.

Preferably, this Gaussian lens further satisfies the following conditional expressions (4) to (7):

$$1.5 \cdot R_5 < (R_1 + R_3)/2 < 2.6 \cdot R_5 \quad (4)$$

$$1.5 \cdot R_6 < (R_8 + R_{10})/2 < 3.0 \cdot R_5 \quad (5)$$

$$0.10 < D_5/f < 0.23 \quad (6)$$

$$0.82 < R_5/|R6| < 1.3 \quad (7)$$

where $R_5$ is the radius of curvature of the image-side surface of the third lens;

$R_1$ is the radius of curvature of the object-side surface of the first lens;

$R_3$ is the radius of curvature of the object-side surface of the second lens;

$R_6$ is the radius of curvature of the object-side surface of the fourth lens;

$R_8$ is the radius of curvature of the image-side surface of the fifth lens;

$R_{10}$ is the radius of curvature of the image-side surface of the sixth lens;

$D_5$ is the air gap between the third and fourth lenses; and f is the focal length of the whole lens system.

Here, the anomalous dispersion ($\delta\theta$) is represented by $\delta\theta = \theta - (1.3647 - 0.002076\nu)$, where partial dispersion $\theta = (n_g - n_d)/(n_F - n_C)$.

BRIEF DESCRIPTION OF THE DRAWINGS

FIG. 1 a view showing a configuration of a color-image-reading Gaussian lens in accordance with a typical example of the present invention;

FIGS. 2A to 2D are aberration charts showing various kinds of aberration (spherical aberration, astigmatism, distortion, and chromatic aberration in magnification) of the color-image-reading Gaussian lens in accordance with Example 1 at a magnification of −1/5×;

FIGS. 3A to 3D are aberration charts showing various kinds of aberration (spherical aberration, astigmatism, distortion, and chromatic aberration in magnification) of the color-image-reading Gaussian lens in accordance with Example 1 at a magnification of −1/1.25×;

FIGS. 4A to 4G are coma charts of the color-image-reading Gaussian lens in accordance with Example 1 at a magnification of −1/2.5×;

FIGS. 5A to 5G are coma charts of the color-image-reading Gaussian lens in accordance with Example 1 at a magnification of −1/1.25×;

FIGS. 6A to 6D are aberration charts showing various kinds of aberration (spherical aberration, astigmatism, distortion, and chromatic aberration in magnification) of the color-image-reading Gaussian lens in accordance with Example 2 at a magnification of −1/2.5×;

FIGS. 7A to 7D are aberration charts showing various kinds of aberration (spherical aberration, astigmatism, distortion, and chromatic aberration in magnification) of the color-image-reading Gaussian lens in accordance with Example 2 at a magnification of −1/1.25×;

FIGS. 8A to 8G are coma charts of the color-image-reading Gaussian lens in accordance with Example 2 at a magnification of −1/2.5×;

FIGS. 10A to 10D are aberration charts showing various kinds of aberration (spherical aberration, astigmatism, distortion, and chromatic aberration in magnification) of the color-image-reading Gaussian lens in accordance with Example 3 at a magnification of −1/2.5×;

FIGS. 11A to 11D are aberration charts showing various kinds of aberration (spherical aberration, astigmatism, distortion, and chromatic aberration in magnification) of the color-image-reading Gaussian lens in accordance with Example 3 at a magnification of −1/1.25×;

FIGS. 14A to 14D are aberration charts showing various kinds of aberration (spherical aberration, astigmatism, distortion, and chromatic aberration in magnification) of the color-image-reading Gaussian lens in accordance with Example 4 at a magnification of −1/2.5×;

FIGS. 15A to 15D are aberration charts showing various kinds of aberration (spherical aberration, astigmatism, distortion, and chromatic aberration in magnification) of the color-image-reading Gaussian lens in accordance with Example 4 at a magnification of −1/1.25×;

FIGS. 16A to 16G are coma charts of the color-image-reading Gaussian lens in accordance with Example 4 at a magnification of −1/2.5×;

FIGS. 17A to 17G are coma charts of the color-image-reading Gaussian lens in accordance with Example 4 at a magnification of −1/1.25×;

FIGS. 18A to 18D are aberration charts showing various kinds of aberration (spherical aberration, astigmatism, distortion, and chromatic aberration in magnification) of the color-image-reading Gaussian lens in accordance with Example 5 at a magnification of −1/2.5×;

FIGS. 19A to 19D are aberration charts showing various kinds of aberration (spherical aberration, astigmatism, distortion, and chromatic aberration in magnification) of the color-image-reading Gaussian lens in accordance with Example 5 at a magnification of −1/1.25×;

FIGS. 20A to 20G are coma charts of the color-image-reading Gaussian lens in accordance with Example 5 at a magnification of −1/2.5×;

FIG. 21 A to 21G are coma charts of the color-image-reading Gaussian lens in accordance with Example 5 at a magnification of −1/1.25×;

FIGS. 22A to 22D are aberration charts showing various kinds of aberration (spherical aberration, astigmatism, distortion, and chromatic aberration in magnification) of the color-image-reading Gaussian lens in accordance with Example 6 at a magnification of −1/2.5×;

FIGS. 23A to 23D are aberration charts showing various kinds of aberration (spherical aberration, astigmatism, distortion, and chromatic aberration in magnification) of the color-image-reading Gaussian lens in accordance with Example 6 at a magnification of −1/1.25×;

FIGS. 25A to 25G are coma charts of the color-image-reading Gaussian lens in accordance with Example 6 at a magnification of −1/1.25×;

FIGS. 26A to 26D are aberration charts showing various kinds of aberration (spherical aberration, astigmatism, distortion, and chromatic aberration in magnification) of the color-image-reading Gaussian lens in accordance with Example 7 at a magnification of −1/2.5×;

FIGS. 27A to 27D are aberration charts showing various kinds of aberration (spherical aberration, astigmatism, distortion, and chromatic aberration in magnification) of the color-image-reading Gaussian lens in accordance with Example 7 at a magnification of −1/1.25×;

FIGS. 28A to 28G are coma charts of the color-image-reading Gaussian lens in accordance with Example 7 at a magnification of −1/2.5×; and FIGS. 29A to 29G are coma charts of the color-image-reading Gaussian lens in accordance with Example 7 at a magnification of −1/1.25×.

DESCRIPTION OF THE PREFERRED EMBODIMENTS

Figure 9A:
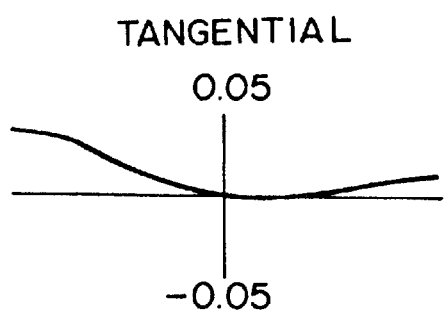
FIGS. 9A to 9G are coma charts of the color-image-reading Gaussian lens in accordance with Example 2 at a magnification of −1/1.25×.

In the following, embodiments of the present invention will be explained with reference to the accompanying drawings.

FIG. 1 is a view showing the color-image-reading Gaussian lens in accordance with Example 5, which is a typical example of the present invention. This Gaussian lens comprises, successively from the object side, a first lens $L_1$ and a second lens $L_2$ each made of a convex lens, a third lens $L_3$ and a fourth lens $L_4$ each made of a concave lens, and a fifth lens $L_5$ and a sixth lens $L_6$ each made of a convex lens.

The second lens $L_2$ and the third lens $L_3$ constitute a cemented convex-concave lens, whereas the fourth lens $L_4$ and the fifth lens $L_5$ constitute a cemented concave-convex lens. A stop 1 is disposed between the third lens $L_3$ and the fourth lens $L_4$. The light from the outside passing through the opening portion of the stop 1 is converged by the convex fifth and sixth lenses $L_5$, $L_6$, thereby forming an image on the imaging surface 2 of a solid-state imaging device (CCD).

In the following, examples of the present invention will be explained with reference to specific data.

EXAMPLE 1

The color-image-reading Gaussian lens in accordance with Example 1 of the present invention comprises, successively from the object side, a first lens $L_1$ made of a convex meniscus lens having a convex surface directed onto the object side, a second lens $L_2$ made of a biconvex lens having a surface with a greater curvature directed onto the object side, a third lens $L_3$ made of a biconcave lens having a surface with a greater curvature directed onto the image side, a fourth lens $L_4$ made of a biconcave lens having a surface with a greater curvature directed onto the object side, a fifth lens $L_5$ made of a biconvex lens having a surface with a greater curvature directed onto the image side, and a sixth lens $L_6$ made of a biconvex lens having a surface with a greater curvature directed onto the image side.

The Gaussian lens in accordance with this example is configured so as to satisfy the following conditional expressions (1) to (7):

$$65 < \nu_2, \nu_5 \tag{1}$$

$$\delta\theta_2, \delta\theta_5 > 0.004 \tag{2}$$

$$0.0012 < \Sigma(\phi_i \cdot \delta\theta_i) < 0.0045 \tag{3}$$

$$1.5 \cdot R_5 < (R_1 + R_3)/2 < 2.6 \cdot R_5 \tag{4}$$

$$1.5 \cdot R_6 < (R_8 + R_{10})/2 < 3.0 \cdot R_6 \tag{5}$$

$$0.10 < D_5/f < 0.23 \tag{6}$$

$$0.82 < R_5/|R_6| < 1.3 \tag{7}$$

where $\nu_2$ is the ν value of the second lens $L_2$ with respect to d-line;

$\nu_5$ is the ν value of the fifth lens $L_5$ with respect to d-line;

$\delta\theta_2$ is the anomalous dispersion of the second lens $L_2$;

$\delta\theta_5$ is the anomalous dispersion of the fifth lens $L_5$;

$\phi_i$ is the refracting power of the i-th lens (wherein i=1 to 6);

$\delta\theta_i$ is the anomalous dispersion of the i-th lens (wherein i=1 to 6);

$R_5$ is the radius of curvature of the image-side surface of the third lens $L_3$;

$R_1$ is the radius of curvature of the object-side surface of the first lens $L_1$;

$R_3$ is the radius of curvature of the object-side surface of the second lens $L_3$;

$R_6$ is the radius of curvature of the object-side surface of the fourth lens $L_4$;

$R_8$ is the radius of curvature of the image-side surface of the fifth lens $L_5$;

$R_{10}$ is the radius of curvature of the image-side surface of the sixth lens $L_6$;

$D_5$ is the air gap between the third and fourth lenses $L_3$, $L_4$; and f is the focal length of the whole lens system.

The above conditional expressions (1) to (7) are preferably satisfied due to the following reasons.

Conditional expressions (1) and (2) are restrictions concerning chromatic aberration and conditions, in particular, for correcting axial chromatic aberration. Conditional expression (1) restricts the lower limit of v value for glass materials of the convex second and fifth lenses $L_2$, $L_5$, thereby preventing dispersion from becoming too large. Conditional expression (2) restricts the anomalous dispersion of the second and fifth lenses $L_2$, $L_5$. When this condition is satisfied together with that of conditional expression (1), axial chromatic aberration can be corrected effectively. Below the lower limit thereof, axial chromatic aberration may not be corrected sufficiently as required.

Conditional expression (3) is a restriction concerning correction of axial chromatic aberration and aberration balance. For favorably correcting axial chromatic aberration, a glass material having anomalous dispersion is typically used as mentioned above. In particular, for obtaining effects of correction with a small number of lens sheets in a lens used at a low magnification of about −1/2.5 to −1/1.25, such a glass material can be considered essential. As the anomalous dispersion of the glass material is greater, the chromatic aberration correcting effect becomes higher. As the refracting power of the lens using this glass material is higher, the correcting power becomes stronger. When only one of the refracting power and anomalous dispersion of the lens, e.g., the refracting power of the glass material, is too strong, however, high-order aberration may occur. Hence, it is preferable in the lens system that the refracting power and anomalous dispersion be enhanced with a good balance therebetween, thereby favorably correcting various kinds of aberration.

For enhancing the refracting power and anomalous dispersion with a good balance therebetween and favorably correcting various kinds of aberration, conditional expression (3) restricts the sum of products of the refracting powers $\phi_i$ and anomalous dispersions $\delta\theta_i$ of the individual lenses, $\Sigma(\phi_i \cdot \delta\theta_i)$, such as to make it greater than a predetermined value. Above the upper limit thereof, the refracting power of each lens becomes so strong that the high-order aberration in spherical aberration and coma increases, thus deteriorating performances of the whole lens system. Below the lower limit thereof, the effect of correcting axial chromatic aberration becomes weaker, thereby failing to attain the degree of correction sufficient for use at a low magnification.

Conditional expressions (4) and (5) define conditions for reducing the Petzval sum so as to correct image surface curvature. In a Gaussian lens, while image surface curvature can be corrected more easily as its concave surfaces have a smaller radius of curvature, coma flare tends to occur when the radius of curvature is too small. According to these conditional expressions, the divergent spherical aberration and coma generated in the concave surfaces ($R_5$, $R_6$) can be corrected with a good balance therebetween at the individual convex surfaces ($R_1$, $R_3$, $R_8$, $R_{10}$). Above the upper limit in each of these conditional expressions, the Petzval sum may become so small that the curvature in the sagittal image surface increases, thereby generating coma flare or deteriorating spherical aberration balance. Below the lower limit thereof, the Petzval sum increases so much that astigmatic difference may occur or spherical aberration may be corrected in excess.

Conditional expression (6) is a restriction for attaining an appropriate distance of air gap between the third lens $L_3$ and fourth lens $L_4$, thereby preventing image surface curvature and coma flare from occurring and astigmatic difference from increasing. Above the upper limit thereof, the Petzval sum may become so large that astigmatic difference increases. Below the lower limit thereof, the Petzval sum may become so small that the curvature in the sagittal image surface increases, thus making it difficult to correct coma.

Since the air gap between the third lens $L_3$ and fourth lens $L_4$ defined by the conditional expression (6) is relatively small, setting this condition not only corrects aberration but also contributes to attaining compactness in the lens.

Conditional expression (7) is a restriction concerning the radii of curvature of the respective opposing concave surfaces of the concave third and fourth lenses $L_3$ and $L_4$. Satisfying this condition averages the divergence of both concave surfaces and is effective, in particular, in preventing unbalanced coma from occurring.

Such a strong refracting power that mentioned above, which is required, together with anomalous dispersion, for correcting axial chromatic aberration is obtained in this example as follows. Namely, while conditional expression (6) restricts the gap between the third lens $L_3$ and the fourth lens $L_4$ within a predetermined range, since this gap is relatively narrow, it is necessary to enhance the curvature of the opposing concave surfaces of the concave third and fourth lenses $L_3$, $L_4$ in order to secure a negative power required for a lens system. Thus, the distance between the two sheets of concave lenses defined in conditional expression (5) for correcting various kinds of aberration requires their concave surfaces to have a stronger refracting power. Consequently, the resulting strong refracting power and the strong refracting power of the convex lens for attaining a balance with respect to the concave lens having the strong refracting power are utilized together with the anomalous dispersion of the glass material, thereby eliminating axial chromatic aberration in a low magnification range.

Table 1 (follows) shows the radius of curvature R of each lens surface, axial surface spacing of each lens (center thickness of each lens and air gap between neighboring lenses) D, refractive index $n_d$ and Abbe number $v_d$ of each lens at d-line, and partial dispersions $\theta_{g,\,d}$ of each lens at g-line and d-line in this example. In Table 1 and its subsequent tables, numerals on the leftmost column successively increase from the object side. The lower part of Table 1 indicates the focal length of the lens system as a whole.

Table 8 (follows) shows the values corresponding the individual conditional expressions in the color-image-reading Gaussian lenses in accordance with this example and the examples subsequent thereto.

As can be seen from Table 8, Example 1 is a color-image-reading Gaussian lens satisfying conditional expressions (1) to (7).

FIGS. 1 to 5G show various kinds of aberration (spherical aberration, astigmatism, distortion, and chromatic aberration in magnification) of the color-image-reading Gaussian lens in accordance with this example at a magnification of −1/2.5×; various kinds of aberration (spherical aberration, astigmatism, distortion, and chromatic aberration in magnification) thereof at a magnification of −1/1.25×; coma thereof at a magnification of −1/2.5×; and coma thereof at a magnification of −1/1.25×; respectively. As can be seen from these charts, a color-image-reading Gaussian lens which can effectively correct axial chromatic aberration and exhibit high performances in a wide wavelength range can be obtained in accordance with this example.

EXAMPLE 2

The structure of the color-image-reading Gaussian Lens in accordance with Example 2 of the present invention will not be explained here since it is the same as that of the Gaussian lens in accordance with Example 1.

Not only the Gaussian lens in accordance with Example 2 satisfies the above-mentioned conditional expressions (1) to (7), but at least one of the third lens $L_3$ and fourth lens $L_4$ therein satisfies the following conditional expressions (8) and (9):

$$35 < \nu_N < 50 \quad (8)$$

$$\delta\theta_N < -0.004 \quad (9)$$

where, assuming N to be the number of the lens satisfying the conditional expressions (8) and (9) in the third and fourth lenses $L_3$, $L_4$, $\nu_N$ is the $\nu$ value of the N-th lens with respect to d-line; and $\delta\theta_N$ is the anomalous dispersion of the N-th lens.

Conditional expressions (8) and (9) define conditions for eliminating the remaining axial chromatic aberration after the second lens $L_2$ and the fifth lens $L_5$ are restricted so as to yield appropriate powers for correcting chromatic aberration and various kinds of aberration with a good balance according to conditional expressions (1) and (2). When a glass material having such an anomalous dispersion that defined by these conditional expressions (8) and (9) is used for at least one concave lens of the third lens $L_3$ and fourth lens $L_4$, the chromatic aberration remaining in the lens system in conformity to conditional expressions (1) to (7) can further be corrected. While using a glass material having anomalous dispersion for the convex second and fifth lenses $L_2$, $L_5$, chromatic aberration can be corrected more effectively when a glass material having anomalous dispersion is used for at least one of the concave third and fourth lenses $L_3$, $L_4$.

Table 2 (follows) shows the radius of curvature R of each lens surface, axial surface spacing of each lens (center thickness of each lens and air gap between neighboring lenses) D, refractive index $n_d$ and Abbe number $\nu_d$ of each lens at d-line, and partial dispersions $\theta_{g,d}$ of each lens at g-line and d-line in this example. The lower part of Table 2 indicates the focal length of the lens system as a whole.

As can be seen from Table 8, Example 2 is a color-image-reading Gaussian lens satisfying conditional expressions (1) to (9).

Figure 9E:
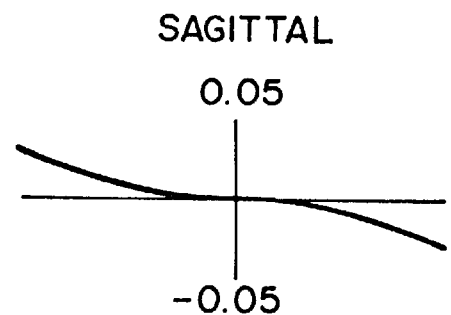
Figure 9B:
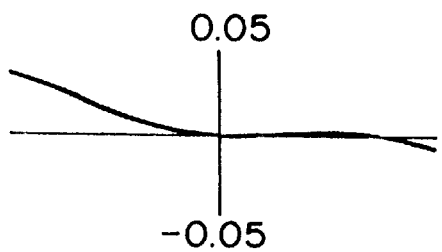
Figure 9F:
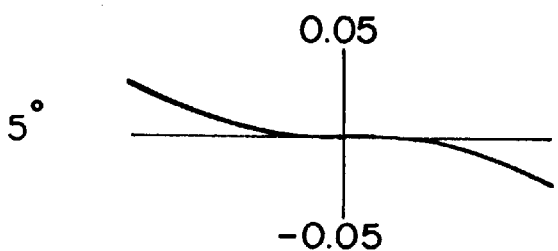
Figure 9C:
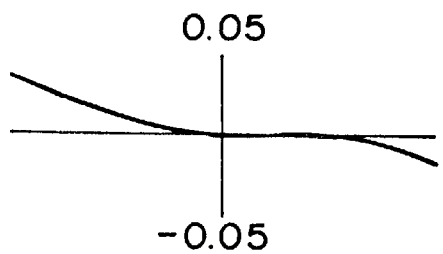
Figure 9G:
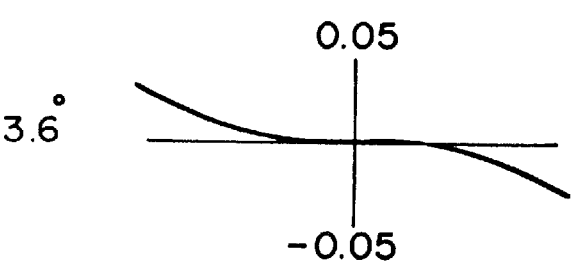
Figure 9D:
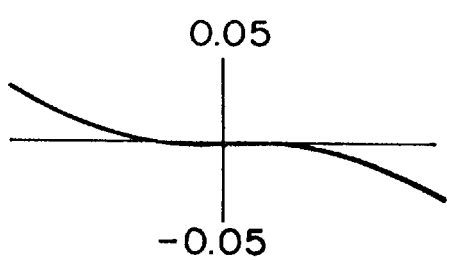

FIGS. 6A to 9G show various kinds of aberration (spherical aberration, astigmatism, distortion, and chromatic aberration in magnification) of the color-image-reading Gaussian lens in accordance with this example at a magnification of −1/2.5×; various kinds of aberration (spherical aberration, astigmatism, distortion, and chromatic aberration in magnification) thereof at a magnification of −1/1.25×; coma thereof at a magnification of −1/2.5×; and coma thereof at a magnification of −1/1.25×; respectively. As can be seen from these charts, a color-image-reading Gaussian lens which can effectively correct axial chromatic aberration and exhibit high performances in a wide wavelength range can be obtained in accordance with this example.

EXAMPLE 3

The color-image-reading Gaussian lens in accordance with Example 3 of the present invention has substantially the same structure as that of the Gaussian lens in accordance with Example 2 except that the sixth lens $L_6$ is a convex meniscus lens having a convex surface directed onto the image side.

Not only the Gaussian lens in accordance with Example 3 satisfies the above-mentioned conditional expressions (1) to (9), but at least one of the first lens $L_1$ and sixth lens $L_6$ therein satisfies the following conditional expression (10), at least one of the third lens $L_3$ and fourth lens $L_4$ therein satisfies the following conditional expressions (11) and (12), and at least one of the first lens $L_1$, second lens $L_2$, fifth lens $L_5$, and sixth lens $L_6$ therein satisfies the following conditional expression (13):

$$\delta\theta_P < -0.002 \quad (10)$$

$$35 < \nu_3, \nu_4 < 50 \quad (11)$$

$$\delta\theta_3, \delta\theta_4 < 0.01 \quad (12)$$

$$\delta\theta_M > 0.0 \quad (13)$$

where, assuming P to be the number of the lens satisfying the conditional expression (10), $\delta\theta_P$ is the anomalous dispersion of the P-th lens;

$\nu_3$ is the $\nu$ value of the third lens $L_3$ with respect to d-line;

$\nu_4$ is the $\nu$ value of the fourth lens $L_4$ with respect to d-line;

$\delta\theta_3$ is the anomalous dispersion of the third lens $L_3$;

$\delta\theta_4$ is the anomalous dispersion of the fourth lens $L_4$; and, assuming M to be the number of the lens satisfying the conditional expression (13) in the first, second, fifth, and sixth lenses $L_1$, $L_2$, $L_5$, $L_6$, $\delta\theta_M$ is the anomalous dispersion of the M-th lens.

Conditional expression (10) defines the lower limit of partial dispersion for at least one of the convex first and sixth lenses $L_1$, $L_6$, and is a condition for facilitating correction of axial chromatic aberration and balancing various kinds of aberration in a lens satisfying conditional expressions (1) to (9). When this conditional expression (10) is satisfied, the second lens $L_2$ and the fifth lens $L_5$ can alleviate their burden of enhancing power for correcting chromatic aberration. Hence, the excessive correction of spherical aberration and occurrence of coma flare due to the increased power of the second lens $L_2$ and fifth lens $L_5$, the image curvature due to the increased Petzval sum, and the like can be reduced, whereby more preferable correcting effects can be obtained.

Conditional expressions (11) and (12) are restrictions concerning chromatic aberration and, in particular, conditions for correcting axial chromatic aberration. Conditional expression (11) defines the lower limit of $\nu$ value in the glass material for the concave third and fourth lenses $L_3$, $L_4$, thereby preventing dispersion from becoming too large.

Conditional expression (12) defines the anomalous dispersion of the third lens $L_3$ and fourth lens $L_4$. Satisfying this condition together with conditional expression (11) enables effective correction of axial chromatic aberration.

Conditional expression (13) is a condition for further eliminating the axial chromatic aberration remaining under the condition of conditional expressions (11) and (12) by using a glass material having anomalous dispersion for at least one of four convex lenses. When all of conditional expressions (3) to (7) and (11) to (13) are satisfied, axial chromatic aberration can be favorably corrected to a sufficient extent as required.

In place of conditional expressions (1) and (2) that define the $\nu$ values and anomalous dispersion levels of the convex second and fifth lenses $L_2$, $L_5$, conditional expressions (11) and (12) define the $\nu$ values and anomalous dispersion levels of the concave third and fourth lenses $L_3$, $L_4$. In this case, as conditional expression (13) indicates, preferable correction of axial chromatic aberration is possible even when the remaining lenses (first lens $L_1$, second lens $L_2$, fifth lens $L_5$, and sixth lens $L_6$) whose $\nu$ values and anomalous dispersion levels are not defined yield anomalous dispersion levels not so great as compared with those of the third and fourth lenses $L_3$, $L_4$.

Table 3 (follows) shows the radius of curvature R of each lens surface, axial surface spacing of each lens (center thickness of each lens and air gap between neighboring lenses) D, refractive index $n_d$ and Abbe number $v_d$ of each lens at d-line, and partial dispersions $\theta_{g,d}$ of each lens at g-line and d-line in this example. The lower part of Table 3 indicates the focal length of the lens system as a whole.

As can be seen from Table 8, Example 3 is a color-image-reading Gaussian lens satisfying conditional expressions (1) to (13).

Figure 12A:
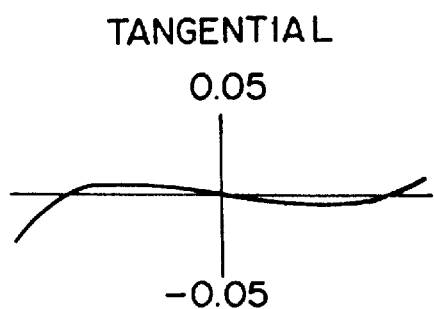
FIGS. 12A to 12G are coma charts of the color-image-reading Gaussian lens in accordance with Example 3 at a magnification of −1/2.5×.
Figure 12E:
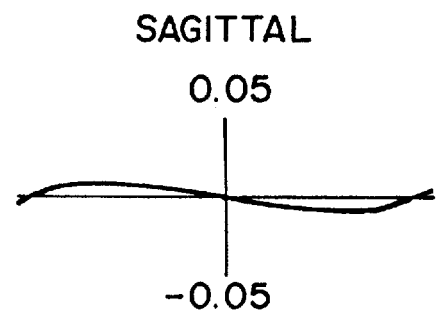
Figure 12B:
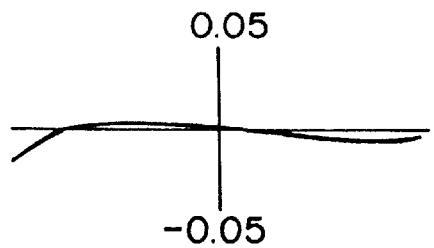
Figure 12F:
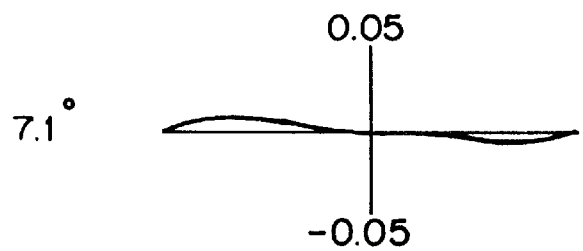
Figure 12C:
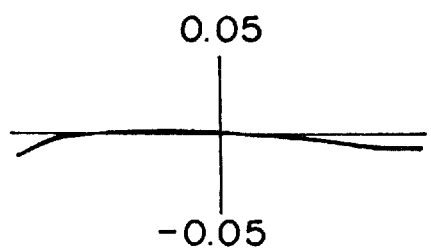
Figure 12G:
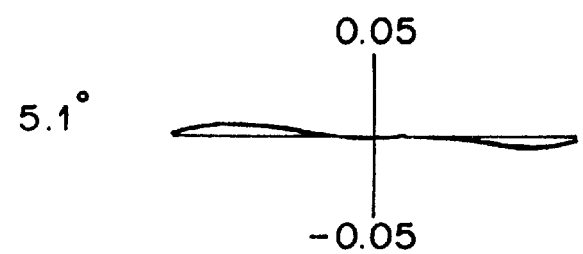
Figure 12D:
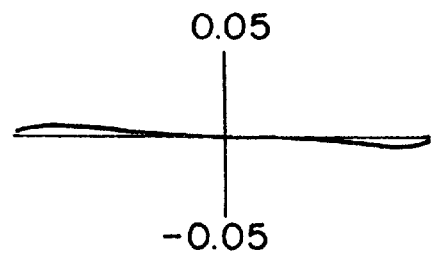
Figure 13A:
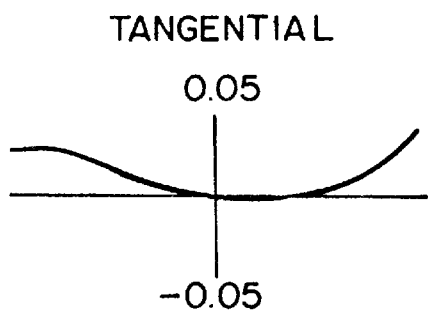
FIGS. 13A to 13G are coma charts of the color-image-reading Gaussian lens in accordance with Example 3 at a magnification of −1/1.25×.
Figure 13E:
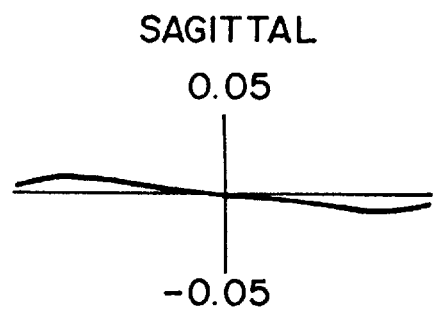
Figure 13B:
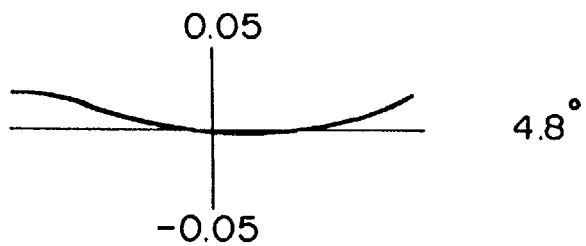
Figure 13F:
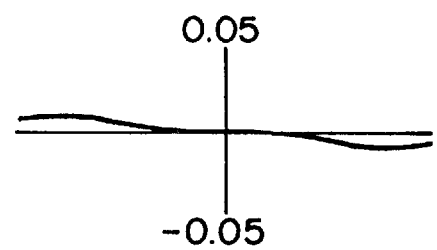
Figure 13C:
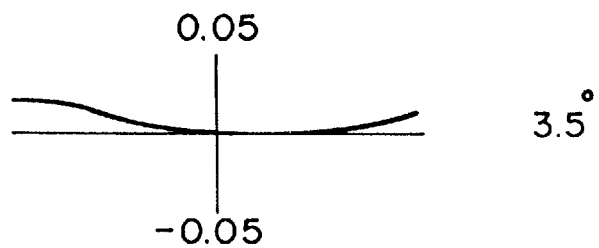
Figure 13G:
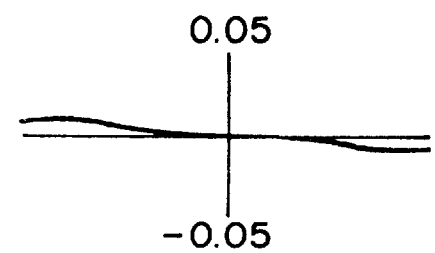
Figure 13D:
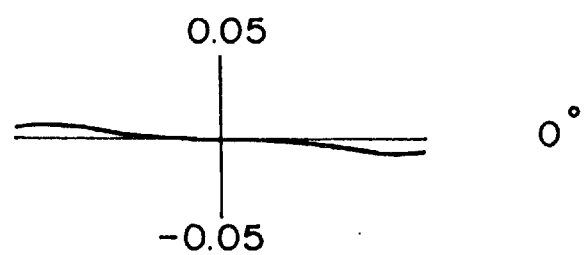

FIGS. 10A to 13G show various kinds of aberration (spherical aberration, astigmatism, distortion, and chromatic aberration in magnification) of the color-image-reading Gaussian lens in accordance with this example at a magnification of −1/2.5×; various kinds of aberration (spherical aberration, astigmatism, distortion, and chromatic aberration in magnification) thereof at a magnification of −1/1.25×; coma thereof at a magnification of −1/2.5×; and coma thereof at a magnification of −1/1.25×; respectively. As can be seen from these charts, a color-image-reading Gaussian lens which can effectively correct axial chromatic aberration and exhibit high performances in a wide wavelength range can be obtained in accordance with this example.

EXAMPLE 4

The color-image-reading Gaussian lens in accordance with Example 4 of the present invention comprises, successively from the object side, a first lens $L_1$ made of a biconvex lens having a surface with a greater curvature directed onto the object side, a second lens $L_2$ made of a convex meniscus lens having a convex surface directed onto the object side, a third lens $L_3$ made of a concave meniscus lens having a convex surface directed onto the object side, a fourth lens $L_4$ made of a concave meniscus lens having a convex surface directed onto the image side, a fifth lens $L_5$ made of a convex meniscus lens having a convex surface directed onto the image side, and a sixth lens $L_6$ made of a biconvex lens having a surface with a greater curvature directed onto the image side.

The lens of this example satisfies the same conditional expressions as those of Example 3.

Table 4 (follows) shows the radius of curvature R of each lens surface, axial surface spacing of each lens (center thickness of each lens and air gap between neighboring lenses) D, refractive index $n_d$ and Abbe number $v_d$ of each lens at d-line, and partial dispersions $\theta_{g,d}$ of each lens at g-line and d-line in this example. The lower part of Table 4 indicates the focal length of the lens system as a whole.

As can be seen from Table 8, Example 4 is a color-image-reading Gaussian lens satisfying conditional expressions (1) to (13).

FIGS. 14A to 17G show various kinds of aberration (spherical aberration, astigmatism, distortion, and chromatic aberration in magnification) of the color-image-reading Gaussian lens in accordance with this example at a magnification of −1/2.5×; various kinds of aberration (spherical aberration, astigmatism, distortion, and chromatic aberration in magnification) thereof at a magnification of −1/1.25×; coma thereof at a magnification of −1/2.5×; and coma thereof at a magnification of −1/1.25×; respectively. As can be seen from these charts, a color-image-reading Gaussian lens which can effectively correct axial chromatic aberration and exhibit high performances in a wide wavelength range can be obtained in accordance with this example.

EXAMPLE 5

The structure of the color-image-reading Gaussian lens in accordance with Example 5 of the present invention is substantially the same as that of the Gaussian lens in accordance with Example 2 except that the sixth lens $L_6$ is a planoconvex lens.

The Gaussian lens of Example 5 satisfies the same conditional expressions as those of Example 3.

Table 5 (follows) shows the radius of curvature R of each lens surface, axial surface spacing of each lens (center thickness of each lens and air gap between neighboring lenses) D, refractive index nd and Abbe number $v_d$ of each lens at d-line, and partial dispersions $\theta_{g,d}$ of each lens at g-line and d-line in this example. The lower part of Table 5 indicates the focal length of the lens system as a whole.

As can be seen from Table 8, Example 5 is a color-image-reading Gaussian lens satisfying conditional expressions (1) to (13).

FIGS. 18A to 21G show various kinds of aberration (spherical aberration, astigmatism, distortion, and chromatic aberration in magnification) of the color-image-reading Gaussian lens in accordance with this example at a magnification of −1/2.5×; various kinds of aberration (spherical aberration, astigmatism, distortion, and chromatic aberration in magnification) thereof at a magnification of −1/1.25×; coma thereof at a magnification of −1/2.5×; and coma thereof at a magnification of −1/1.25×; respectively. As can be seen from these charts, a color-image-reading Gaussian lens which can effectively correct axial chromatic aberration and exhibit high performances in a wide wavelength range can be obtained in accordance with this example.

EXAMPLE 6

The color-image-reading Gaussian lens in accordance with Example 6 of the present invention comprises, successively from the object side, a first lens $L_1$ made of a biconvex lens having a surface with a greater curvature directed onto the object side, a second lens $L_2$ made of a biconvex lens having a surface with a greater curvature directed onto the object side, a third lens $L_3$ made of a biconcave lens having a surface with a greater curvature directed onto the image side, a fourth lens $L_4$ made of a concave meniscus lens having a convex surface directed onto the image side, a fifth lens $L_5$ made of a convex meniscus lens having a convex surface directed onto the image side, and a sixth lens $L_6$ made of a convex meniscus lens having a convex surface directed onto the image side.

The Gaussian lens of Example 6 satisfies the same conditional expressions as those of Example 3.

Table 6 (follows) shows the radius of curvature R of each lens surface, axial surface spacing of each lens (center thickness of each lens and air gap between neighboring lenses) D, refractive index $n_d$ and Abbe number $v_d$ of each lens at d-line, and partial dispersions $\theta_{g,d}$ of each lens at g-line and d-line in this example. The lower part of Table 6 indicates the focal length of the lens system as a whole.

As can be seen from Table 8, Example 6 is a color-image-reading Gaussian lens satisfying conditional expressions (1) to (13).

Figure 24A:
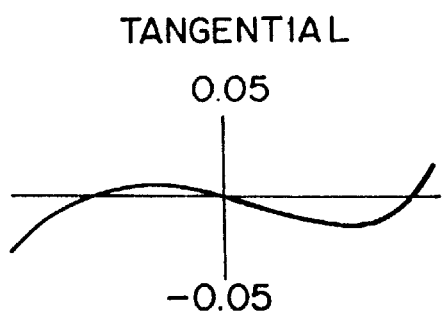
FIGS. 24A to 24G are coma charts of the color-image-reading Gaussian lens in accordance with Example 6 at a magnification of −1/2.5×.
Figure 24E:
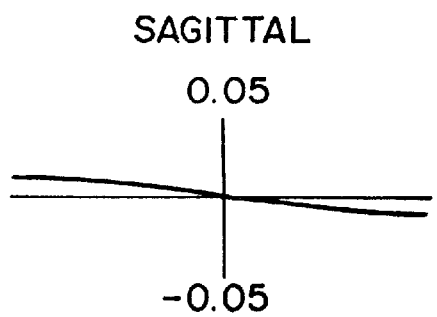
Figure 24B:
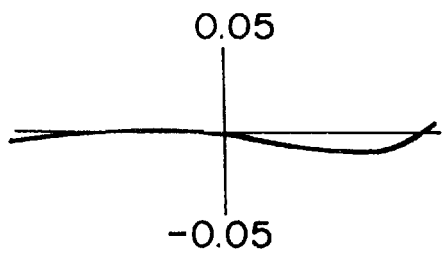
Figure 24F:
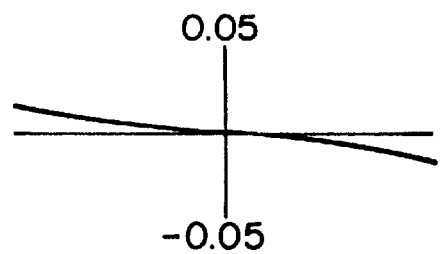
Figure 24C:
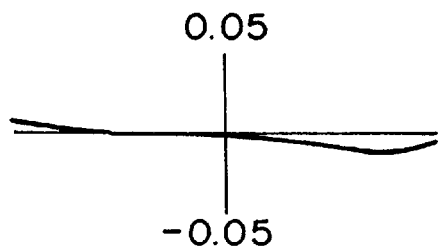
Figure 24G:
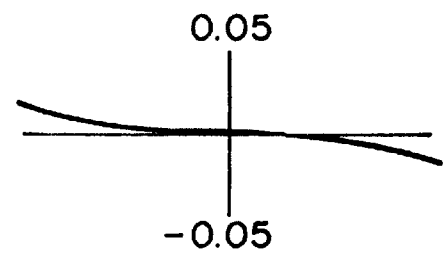
Figure 24D:
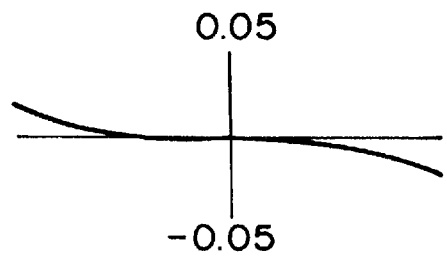

FIGS. 22A to 25G show various kinds of aberration (spherical aberration, astigmatism, distortion, and chromatic aberration in magnification) of the color-image-reading Gaussian lens in accordance with this example at a magnification of −1/2.5×; various kinds of aberration (spherical aberration, astigmatism, distortion, and chromatic aberration in magnification) thereof at a magnification of −1/1.25×; coma thereof at a magnification of −1/2.5×; and coma thereof at a magnification of −1/1.25×; respectively. As can be seen from these charts, a color-image-reading Gaussian lens which can effectively correct axial chromatic aberration and exhibit high performances in a wide wavelength range can be obtained in accordance with this example.

EXAMPLE 7

The structure of the color-image-reading Gaussian lens in accordance with Example 7 of the present invention is substantially the same as that of the Gaussian lens in accordance with Example 2 except that the fifth lens $L_5$ is a biconvex lens having a surface with a greater radius directed onto the object side and that the sixth lens $L_6$ is a convex meniscus lens having a convex surface directed onto the image side.

The Gaussian lens of Example 7 satisfies conditional expressions (3) to (7) and (11) to (13).

Table 7 (follows) shows the radius of curvature R of each lens surface, axial surface spacing of each lens (center thickness of each lens and air gap between neighboring lenses) D, refractive index $n_d$ and Abbe number $v_d$ of each lens at d-line, and partial dispersions $\theta_{g,d}$ of each lens at g-line and d-line in this example. The lower part of Table 7 indicates the focal length of the lens system as a whole.

As can be seen from Table 8, Example 7 is a color-image-reading Gaussian lens satisfying conditional expressions (3) to (7) and (11) to (13).

FIGS. 26A to 29G show various kinds of aberration (spherical aberration, astigmatism, distortion, and chromatic aberration in magnification) of the color-image-reading Gaussian lens in accordance with this example at a magnification of −1/2.5×; various kinds of aberration (spherical aberration, astigmatism, distortion, and chromatic aberration in magnification) thereof at a magnification of −1/1.25×; coma thereof at a magnification of −1/2.5×; and coma thereof at a magnification of −1/1.25×; respectively. As can be seen from these charts, a color-image-reading Gaussian lens which can effectively correct axial chromatic aberration and exhibit high performances in a wide wavelength range can be obtained in accordance with this example.

As explained in the foregoing, in a lens used at a low magnification of −1/2.5× to −1/1.25× for reading out color images, color originals, or negative or positive films, a glass material having anomalous dispersion is appropriately disposed, and an appropriate air gap is provided between the third and forth lenses, thus making it possible to use a lens having a high refracting power, whereby the color-image-reading Gaussian lens in accordance with the present invention can effectively correct axial chromatic aberration in particular and exhibit high performances in a wide wavelength range.

TABLE 1

|   | R | D | $n_d$ | $v_d$ | $\theta_{g,d}$ |
|---|---|---|---|---|---|
| 1 | 27.647 | 3.88 | 1.67790 | 55.5 | 1.2457 |
| 2 | 53.582 | 0.20 | | | |
| 3 | 18.863 | 6.01 | 1.56907 | 71.3 | 1.2431 |
| 4 | −28.318 | 1.00 | 1.51454 | 54.6 | 1.2473 |
| 5 | 13.103 | 9.12 | | | |
| 6 | −14.904 | 1.20 | 1.58215 | 42.0 | 1.2758 |
| 7 | 32.919 | 6.01 | 1.56907 | 71.3 | 1.2431 |
| 8 | −24.379 | 1.53 | | | |

TABLE 1-continued

|   | R | D | $n_d$ | $v_d$ | $\theta_{g,d}$ |
|---|---|---|---|---|---|
| 9 | 12433.000 | 4.78 | 1.70154 | 41.1 | 1.2762 |
| 10 | −41.848 | | | | | f = 65.59

TABLE 2

|   | R | D | $n_d$ | $v_d$ | $\theta_{g,d}$ |
|---|---|---|---|---|---|
| 1 | 19.693 | 3.50 | 1.78830 | 47.4 | 1.2538 |
| 2 | 79.225 | 0.20 | | | |
| 3 | 24.074 | 5.15 | 1.56907 | 71.3 | 1.2431 |
| 4 | −64.570 | 1.00 | 1.62004 | 36.3 | 1.2896 |
| 5 | 12.774 | 9.15 | | | |
| 6 | −10.692 | 1.14 | 1.61340 | 44.3 | 1.2613 |
| 7 | 43.176 | 5.23 | 1.56907 | 71.3 | 1.2431 |
| 8 | −15.290 | 0.83 | | | |
| 9 | 401.150 | 5.00 | 1.78500 | 43.7 | 1.2642 |
| 10 | −39.811 | | | | | f = 48.72

TABLE 3

|   | R | D | $n_d$ | $v_d$ | $\theta_{g,d}$ |
|---|---|---|---|---|---|
| 1 | 22.370 | 3.80 | 1.64850 | 53.0 | 1.2536 |
| 2 | 72.170 | 0.30 | | | |
| 3 | 22.695 | 5.01 | 1.60300 | 65.5 | 1.2349 |
| 4 | −83.247 | 1.50 | 1.61340 | 43.8 | 1.2629 |
| 5 | 13.438 | 12.76 | | | |
| 6 | −12.073 | 1.50 | 1.61340 | 43.8 | 1.2629 |
| 7 | 89.631 | 5.11 | 1.56907 | 71.3 | 1.2431 |
| 8 | −18.325 | 0.30 | | | |
| 9 | −219.410 | 4.00 | 1.64850 | 53.0 | 1.2536 |
| 10 | −26.029 | | | | | f = 60.34

TABLE 4

|   | R | D | $n_d$ | $v_d$ | $\theta_{g,d}$ |
|---|---|---|---|---|---|
| 1 | 22.686 | 3.80 | 1.56907 | 71.3 | 1.2431 |
| 2 | −463.990 | 0.30 | | | |
| 3 | 14.375 | 5.01 | 1.56907 | 71.3 | 1.2431 |
| 4 | 161.460 | 2.09 | 1.81600 | 46.6 | 1.2568 |
| 5 | 10.610 | 10.85 | | | |
| 6 | −12.659 | 3.14 | 1.81600 | 46.6 | 1.2568 |
| 7 | −48.969 | 5.11 | 1.56907 | 71.3 | 1.2431 |
| 8 | −16.942 | 0.30 | | | |
| 9 | 219.840 | 4.00 | 1.56904 | 71.3 | 1.2431 |
| 10 | −29.676 | | | | | f = 61.28

TABLE 5

|   | R | D | $n_d$ | $v_d$ | $\theta_{g,d}$ |
|---|---|---|---|---|---|
| 1 | 18.806 | 4.00 | 1.57135 | 53.0 | 1.2549 |
| 2 | 113.580 | 0.30 | | | |
| 3 | 19.671 | 4.91 | 1.56907 | 71.3 | 1.2431 |
| 4 | −48.070 | 1.50 | 1.61340 | 44.3 | 1.2613 |
| 5 | 11.634 | 9.20 | | | |
| 6 | −12.146 | 1.50 | 1.61340 | 44.3 | 1.2613 |
| 7 | 30.011 | 4.86 | 1.56907 | 71.3 | 1.2431 |
| 8 | −21.477 | 1.57 | | | |
| 9 | ∞ | 3.80 | 1.63930 | 44.9 | 1.2709 |
| 10 | −26.328 | | | | | f = 60.03

TABLE 6

|   | R | D | $n_d$ | $v_d$ | $\theta_{g,d}$ |
|---|---|---|---|---|---|
| 1 | 43.794 | 3.87 | 1.72342 | 38.0 | 1.2891 |
| 2 | −278.240 | 0.56 | | | |
| 3 | 23.003 | 4.85 | 1.49700 | 81.6 | 1.2322 |
| 4 | −56.025 | 2.03 | 1.61340 | 44.3 | 1.2613 |
| 5 | 14.213 | 8.85 | | | |
| 6 | −11.075 | 1.48 | 1.61340 | 44.3 | 1.2613 |
| 7 | −94.331 | 4.79 | 1.56907 | 71.3 | 1.2431 |
| 8 | −15.508 | 0.26 | | | |
| 9 | −163.070 | 3.97 | 1.56907 | 71.3 | 1.2431 |
| 10 | −21.422 | | | | | f = 58.66

TABLE 7

|   | R | D | $n_d$ | $v_d$ | $\theta_{g,d}$ |
|---|---|---|---|---|---|
| 1 | 30.851 | 6.47 | 1.59240 | 68.3 | 1.2434 |
| 2 | 164.690 | 3.68 | | | |
| 3 | 17.141 | 5.00 | 1.67790 | 55.5 | 1.2457 |
| 4 | −31.544 | 1.11 | 1.61340 | 44.3 | 1.2613 |
| 5 | 11.308 | 6.40 | | | |
| 6 | −13.407 | 1.11 | 1.61340 | 44.3 | 1.2613 |
| 7 | 20.752 | 5.75 | 1.65830 | 57.3 | 1.2419 |
| 8 | −22.180 | 3.00 | | | |
| 9 | −550.050 | 6.50 | 1.67100 | 57.2 | 1.2370 |
| 10 | −34.340 | | | | | f = 54.08

TABLE 8

|   | Example 1 | Example 2 | Example 3 | Example 4 |
|---|---|---|---|---|
| $v_2$ | 71.3 | 71.3 | 65.5 | 71.3 |
| $v_3$ | — | — | 43.8 | 46.6 |
| $v_4$ | — | 44.3 | 43.8 | 46.6 |
| $v_5$ | 71.3 | 71.3 | 71.3 | 71.3 |
| $\delta\theta_1$ | — | — | −0.001 | 0.026 |
| $\delta\theta_2$ | 0.026 | 0.026 | 0.006 | 0.026 |
| $\delta\theta_3$ | — | — | −0.011 | −0.011 |
| $\delta\theta_4$ | — | −0.011 | −0.011 | −0.011 |
| $\delta\theta_5$ | 0.026 | 0.026 | 0.026 | 0.026 |
| $\delta\theta_6$ | — | — | −0.001 | 0.026 |
| $(R_1 + R_3)/2R_5$ | 1.77 | 1.71 | 1.68 | 1.75 |
| $(R_8 + R_{10})/2R_6$ | 2.22 | 2.58 | 1.84 | 1.84 |
| $D_5/f$ | 0.14 | 0.19 | 0.21 | 0.18 |
| $R_5/|R_6|$ | 0.88 | 1.19 | 1.11 | 0.84 |
| $\Sigma \phi_i \cdot \delta\theta_i$ | 0.0025 | 0.0024 | 0.0024 | 0.0041 |

|   | Example 5 | Example 6 | Example 7 |
|---|---|---|---|
| $v_2$ | 71.3 | 81.6 | — |
| $v_3$ | 44.3 | 44.3 | 44.3 |
| $v_4$ | 44.3 | 44.3 | 44.3 |
| $v_5$ | 71.3 | 71.3 | — |
| $\delta\theta_1$ | 0.000 | 0.003 | 0.020 |
| $\delta\theta_2$ | 0.026 | 0.037 | — |
| $\delta\theta_3$ | −0.011 | −0.011 | −0.011 |
| $\delta\theta_4$ | −0.011 | −0.011 | −0.011 |
| $\delta\theta_5$ | 0.026 | 0.026 | — |
| $\delta\theta_6$ | −0.001 | 0.026 | — |
| $(R_1 + R_3)/2R_5$ | 1.65 | 2.35 | 2.12 |
| $(R_8 + R_{10})/2R_6$ | 1.97 | 1.67 | 2.11 |
| $D_5/f$ | 0.15 | 0.15 | 0.12 |
| $R_5/|R_6|$ | 0.96 | 1.28 | 0.84 |
| $\Sigma \phi_i \cdot \delta\theta_i$ | 0.0038 | 0.0038 | 0.0015 |

What is claimed is:

1. A color-image-reading Gaussian lens constituted by six lens sheets comprising, successively from an object side, first and second lenses each made of a convex lens, third and fourth lenses each made of a concave lens, and fifth and sixth lenses each made of a convex lens; and a stop disposed between the third and fourth lenses, wherein the following conditional expressions (1) to (3) are satisfied:

$$65 < v_2, v_5 \qquad (1)$$

$$\delta\theta_2, \delta\theta_5 > 0.004 \qquad (2)$$

$$0.0012 < \Sigma(\phi_i \cdot \delta\theta_i) < 0.0045 \qquad (3)$$

where $v_2$ is the v value of the second lens with respect to d-line;

$v_5$ is the v value of the fifth lens with respect to d-line;

$\delta\theta_2$ is the anomalous dispersion of the second lens;

$\delta\theta_5$ is the anomalous dispersion of the fifth lens;

$\phi_i$ is the refracting power of the i-th lens (wherein i=1 to 6); and $\delta\theta_i$ is the anomalous dispersion of the i-th lens (wherein i=1 to 6).

2. A color-image-reading Gaussian lens according to claim 1, further satisfying the following conditional expressions (4) to (7):

$$1.5 \cdot R_5 < (R_1 + R_3)/2 < 2.6 \cdot R_5 \qquad (4)$$

$$1.5 \cdot R_6 < (R_8 + R_{10})/2 < 3.0 \cdot R_6 \qquad (5)$$

$$0.10 < D_5/f < 0.23 \qquad (6)$$

$$0.82 < R_5/|R_6| < 1.3 \qquad (7)$$

where $R_5$ is the radius of curvature of the image-side surface of the third lens;

$R_1$ is the radius of curvature of the object-side surface of the first lens;

$R_3$ is the radius of curvature of the object-side surface of the second lens;

$R_6$ is the radius of curvature of the object-side surface of the fourth lens;

$R_8$ is the radius of curvature of the image-side surface of the fifth lens;

$R_{10}$ is the radius of curvature of the image-side surface of the sixth lens;

$D_5$ is the air gap between the third and fourth lenses; and f is the focal length of the whole lens system.

3. A color-image-reading Gaussian lens according to claim 1, wherein at least one of the third and fourth lenses satisfies the following conditional expressions (8) and (9):

$$35 < v_N < 50 \qquad (8)$$

$$\delta\theta_N < -0.004 \qquad (9)$$

where, assuming N to be the number of the lens satisfying the conditional expressions (8) and (9) in the third and fourth lenses, $v_N$ is the v value of the N-th lens with respect to d-line; and $\delta\theta_N$ is the anomalous dispersion of the N-th lens.

4. A color-image-reading Gaussian lens according to claim 1, wherein at least one of the first and sixth lenses satisfies the following conditional expression (10):

$$\delta\theta_P < -0.002 \qquad (10)$$

where, assuming P to be the number of the lens satisfying the conditional expression (10), $\delta\theta_P$ is the anomalous dispersion of the P-th lens.

5. A color-image-reading Gaussian lens constituted by six lens sheets comprising, successively from an object side, first and second lenses each made of a convex lens, third and fourth lenses each made of a concave lens, and fifth and sixth lenses each made of a convex lens; and a stop disposed between the third and fourth lenses, wherein the following conditional expressions (11), (12), and (3) are satisfied:

$$35 < \nu_3, \nu_4 < 50 \quad (11)$$

$$\delta\theta_3, \delta\theta_4 < 0.01 \quad (12)$$

$$0.0012 < \Sigma(\phi_i \cdot \delta\theta_i) < 0.0045 \quad (3)$$

where $\nu_3$ is the ν value of the third lens with respect to d-line;
$\nu_4$ is the ν value of the fourth lens with respect to d-line;
$\delta\theta_3$ is the anomalous dispersion of the third lens;
$\delta\theta_4$ is the anomalous dispersion of the fourth lens;
$\phi_i$ is the refracting power of the i-th lens (wherein i=1 to 6); and
$\delta\theta_i$ is the anomalous dispersion of the i-th lens (wherein i=1 to 6); and wherein at least one of the first, second, fifth, and sixth lenses satisfies the following condition (13):

$$\delta\theta_M > 0.0 \quad (13)$$

where, assuming that M to be the number of the lens satisfying the conditional expression (13) in the first, second, fifth, and sixth lenses, $\delta\theta_M$ is the anomalous dispersion of the M-th lens.

6. A color-image-reading Gaussian lens according to claim 5, further satisfying the following conditional expressions (4) to (7):

$$1.5 \cdot R_5 < (R_1 + R_3)/2 < 2.6 \cdot R_5 \quad (4)$$

$$1.5 \cdot R_6 < (R_8 + R_{10})/2 < 3.0 \cdot R_6 \quad (5)$$

$$0.10 < D_5/f < 0.23 \quad (6)$$

$$0.82 < R_5/|R_6| < 1.3 \quad (7)$$

where $R_5$ is the radius of curvature of the image-side surface of the third lens;
$R_1$ is the radius of curvature of the object-side surface of the first lens;
$R_3$ is the radius of curvature of the object-side surface of the second lens;
$R_6$ is the radius of curvature of the object-side surface of the fourth lens;
$R_8$ is the radius of curvature of the image-side surface of the fifth lens;
$R_{10}$ is the radius of curvature of the image-side surface of the sixth lens;
$D_5$ is the air gap between the third and fourth lenses; and
f is the focal length of the whole lens system.

* * * * *